United States Patent
Castro et al.

(10) Patent No.: US 6,277,161 B1
(45) Date of Patent: *Aug. 21, 2001

(54) ABRASIVE GRAIN, ABRASIVE ARTICLES, AND METHODS OF MAKING AND USING THE SAME

(75) Inventors: Darren T. Castro; Ahmet Celikkaya, both of Woodbury; Larry D. Monroe, Maplewood, all of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/406,952

(22) Filed: Sep. 28, 1999

(51) Int. Cl.[7] .............................. B24D 3/34; C09K 3/14; C09C 1/68

(52) U.S. Cl. ............................. 51/309; 51/295; 51/308; 501/128; 451/28

(58) Field of Search ........................ 51/307, 308, 309, 51/295; 501/127, 128, 153; 451/28

(56) References Cited

U.S. PATENT DOCUMENTS

| | | |
|---|---|---|
| 4,314,827 | 2/1982 | Leitheiser et al. . |
| 4,518,397 | 5/1985 | Leitherser et al. . |
| 4,623,364 | 11/1986 | Cottringer et al. . |
| 4,657,754 | 4/1987 | Bauer et al. . |
| 4,744,802 | 5/1988 | Schwabel . |
| 4,770,671 | 9/1988 | Monroe et al. . |
| 4,786,292 | 11/1988 | Janz et al. . |
| 4,797,139 | 1/1989 | Bauer . |
| 4,797,269 | 1/1989 | Bauer et al. . |
| 4,800,685 | 1/1989 | Haynes, Jr. . |
| 4,881,951 | 11/1989 | Wood et al. . |
| 4,960,441 | 10/1990 | Pellow et al. . |
| 4,964,883 | 10/1990 | Morris et al. . |
| 5,007,943 | 4/1991 | Kelly et al. . |
| 5,011,508 | 4/1991 | Wald et al. . |
| 5,076,815 | 12/1991 | Kunz et al. . |
| 5,103,598 | 4/1992 | Kelly . |
| 5,131,923 | 7/1992 | Markhoff-Matheny et al. . |
| 5,164,348 | 11/1992 | Wood . |
| 5,178,849 | 1/1993 | Bauer . |
| 5,185,299 | 2/1993 | Wood et al. . |
| 5,192,339 | 3/1993 | Hasegawa et al. . |
| 5,194,243 | 3/1993 | Pearson et al. . |
| 5,204,300 | 4/1993 | Kumagi et al. . |
| 5,219,806 | 6/1993 | Wood . |
| 5,259,147 | 11/1993 | Falz et al. . |
| 5,284,809 | 2/1994 | Van Dijen . |
| 5,387,268 | 2/1995 | Hiraiwa et al. . |
| 5,445,807 | 8/1995 | Pearson . |
| 5,489,318 * | 2/1996 | Erickson et al. ............ 51/309 |
| 5,498,269 | 3/1996 | Larmie . |
| 5,516,348 * | 5/1996 | Conwell et al. ............ 51/309 |
| 5,527,369 | 6/1996 | Garg . |
| 5,551,963 | 9/1996 | Larmie . |
| 5,551,964 | 9/1996 | Wood . |
| 5,593,467 | 1/1997 | Monroe . |
| 5,593,468 | 1/1997 | Khaund et al. . |
| 5,611,829 | 3/1997 | Monroe et al. . |
| 5,641,469 | 6/1997 | Garg et al. . |
| 5,645,619 | 7/1997 | Erickson et al. . |
| 5,651,801 * | 7/1997 | Monroe et al. ............ 51/309 |
| 5,690,707 | 11/1997 | Wood et al. . |
| 5,725,162 | 3/1998 | Garg et al. . |
| 5,728,184 | 3/1998 | Monroe . |
| 5,752,996 | 5/1998 | Wood . |
| 5,770,145 | 6/1998 | Gerk et al. . |
| 5,776,214 | 7/1998 | Wood . |
| 5,877,105 | 3/1999 | Iwai et al. . |
| 5,950,937 | 9/1999 | Iwai et al. . |

FOREIGN PATENT DOCUMENTS

| | | |
|---|---|---|
| 2014482 | 10/1990 | (CA) . |
| 395 500 | 10/1990 | (EP) . |
| 0 786 441 A1 | 7/1997 | (EP) . |
| 0 603 715 B1 | 3/1999 | (EP) . |
| WO 95/12547 | 5/1995 | (WO) . |
| WO 97/49647 | 12/1997 | (WO) . |
| WO 98/12152 | 3/1998 | (WO) . |
| WO99/22913 | 5/1999 | (WO) . |
| WO 99/38817 | 8/1999 | (WO) . |
| 952494 | 3/1995 | (ZA) . |

* cited by examiner

*Primary Examiner*—Michael Marcheschi
(74) *Attorney, Agent, or Firm*—Gregory D. Allen

(57) ABSTRACT

Alpha alumina-based abrasive grain. The abrasive grain can be incorporated into abrasive products such as coated abrasives, bonded abrasives, non-woven abrasives, and abrasive brushes.

72 Claims, 4 Drawing Sheets

ABRASIVE GRAIN, ABRASIVE ARTICLES, AND METHODS OF MAKING AND USING THE SAME

FIELD OF THE INVENTION

This invention pertains to abrasive grain and a method of making abrasive grain. The abrasive grain can be incorporated into a variety of abrasive articles, including bonded abrasives, coated abrasives, nonwoven abrasives, and abrasive brushes.

DESCRIPTION OF RELATED ART

In the early 1980's a new and substantially improved type of alumina abrasive grain, commonly referred to as "sol gel" or "sol gel-derived" abrasive grain, was commercialized. This new type of alpha alumina abrasive grain had a microstructure made up of very fine alpha alumina crystallites. The grinding performance of the new abrasive grain on metal, as measured, for example, by life of abrasive products made with the grain was dramatically longer than such products made from conventional, fused alumina abrasive grain.

In general, sol gel abrasive grain are typically made by preparing a dispersion or sol comprising water, alumina monohydrate (boehmite), and optionally peptizing agent (e.g., an acid such as nitric acid), gelling the dispersion, drying the gelled dispersion, crushing the dried dispersion into particles, calcining the particles to remove volatiles, and sintering the calcined particles at a temperature below the melting point of alumina. Frequently, the dispersion also includes one or more oxide modifiers (e.g., $CeO_2$, $Cr_2O_3$, $CoO$, $Dy_2O_3$, $Er_2O_3$, $Eu_2O_3$, $Fe_2O_3$, $Gd_2O_3$, $HfO_2$, $La_2O_3$, $Li_2O$, $MgO$, $MnO$, $Na_2O$, $Nd_2O_3$, $NiO$, $Pr_2O_3$, $Sm_2O_3$, $SiO_2$, $SnO_2$, $TiO_2$, $Y_2O_3$, $Yb_2O_3$, $ZnO$, and $ZrO_2$), nucleating agents (e.g., $\alpha\text{-}Al_2O_3$, $\alpha\text{-}Cr_2O_3$, and $\alpha\text{-}Fe_2O_3$) and/or precursors thereof. Such additions are typically made to alter or otherwise modify the physical properties and/or microstructure of the sintered abrasive grain. In addition, or alternatively, such oxide modifiers, nucleating agents, and/or precursors thereof may be impregnated into the dried or calcined material (typically calcined particles). Further details regarding sol gel abrasive grain, including methods for making them, can be found, for example, in U.S. Pat. No. 4,314,827 (Leitheiser et al.), U.S. Pat. No. 4,518,397 (Leitheiser et al.), U.S. Pat. No. 4,623,364 (Cottringer et al.), U.S. Pat. No. 4,744,802 (Schwabel), U.S. Pat. No. 4,770,671 (Monroe et al.), U.S. Pat. No. 4,881,951 (Wood et al.), U.S. Pat. No. 4,960,441 (Pellow et al.) U.S. Pat. No. 5,011,508 (Wald et al.), U.S. Pat. No. 5,090,968 (Pellow), U.S. Pat. No. 5,139,978 (Wood), U.S. Pat. No. 5,201,916 (Berg et al.), U.S. Pat. No. 5,227,104 (Bauer), U.S. Pat. No. 5,366,523 (Rowenhorst et al.), U.S. Pat. No. 5,429,647 (Larmie), U.S. Pat. No. 5,547,479 (Conwell et al.), U.S. Pat. No. 5,498,269 (Larmie), U.S. Pat. No. 5,551,963 (Larmie), U.S. Pat. No. 5,725,162 (Garg et al.), and U.S. Pat. No. 5,776,214 (Wood).

Over the past fifteen years sintered alumina abrasive grain, in particular sol gel-derived alpha alumina-based sintered abrasive grain, have been used in a wide variety of abrasive products (e.g., bonded abrasives, coated abrasives, and abrasive brushes) and abrading applications, including both low and high pressure grinding applications. For example sol gel-derived abrasive grain have been incorporated into resin bonded grinding wheels, and have been found to be particularly useful in high pressure, high stock removal grinding applications. Such abrasive grain have been used in vitrified grinding wheels for the precision grinding of camshafts. Sol gel-derived abrasive grain have also been incorporated into medium grade coated abrasive products that are used to sand wood cabinet panels. In addition, coated abrasive discs that include sol gel-derived abrasive grain are used under relatively light pressure to abrade painted automotive parts.

For some higher pressure grinding applications, it is preferred that the sintered alumina abrasive grain be relatively tough to withstand the high grinding forces. Such increased toughness may be achieved through the addition of various metal oxides to the alumina crystal structure. Alternatively, in some lower pressure grinding applications, it is preferred that the sintered alumina abrasive grain be more friable so that the abrasive grain can "breakdown" during grinding. In order to achieve the optimum grinding performance under these wide ranges of grinding conditions, a variety of sintered alpha alumina abrasive grains have been developed and commercialized.

Although there are a number of commercially available sintered alumina abrasive grains, sintered alumina abrasive grain that can provide desirable grinding or abrading characteristics (e.g., long life, high metal removal rates, and desired finish) under certain grinding conditions (e.g., under relatively high grinding pressure or relatively low grinding pressures) what is desired is an abrasive grain that has desirable grinding or abrading characteristics under a relatively wide range of grinding pressure (e.g., both high and low grinding pressures). The availability of such an abrasive grain is advantageous, for example, because it reduces, or perhaps in some cases, eliminates the need for multiple inventories of abrasive grain or abrasive products. Further, for example, the availability of abrasive products incorporating such an abrasive grain reduces or eliminates the need for the end user to change the abrasive product because of a change in grinding conditions.

SUMMARY OF THE INVENTION

In one aspect, the present invention surprisingly provides sintered alpha alumina-based abrasive grain comprising $SiO_2$ and $ZrO_2$ (typically at least 0.1 percent (preferably, at least 0.2, 0.25, 0.3, or even 0.5 percent) by weight of each of $SiO_2$ and $ZrO_2$, based on the total metal oxide content of the abrasive grain), wherein the alpha alumina of the abrasive grain has an average crystallite size of less than 1 (preferably, less than 0.8, 0.7 0.6, 0.5, 0.4, or even 0.3) micrometer, and wherein the $ZrO_2$ that is present as crystalline zirconia has an average crystallite size of less than 0.25 micrometer. Typically, at least a majority of the alpha alumina was nucleated with a nucleating agent. Preferably the average crystallite size of the alpha alumina is less than 0.75 micrometer, more preferably, less than 0.5 micrometer, and even more preferably, less than 0.3 micrometer.

One preferred sintered alpha alumina-based abrasive grain according to the present invention comprises at least 0.1 percent (preferably, at least 0.2, 0.25, 0.3, or even 0.5 percent; more preferably at least 1 percent; even more preferably in the range from 1 to 3 percent) by weight $SiO_2$ and at least 0.1 percent (preferably, at least 0.2, 0.25, 0.3, or even 0.5 percent; more preferably at least 1 percent; even more preferably in the range from 1 to 14 percent, or even from 4 to 14 percent) by weight $ZrO_2$, based on the total metal oxide content of the abrasive grain), wherein the alpha alumina of the abrasive grain has an average crystallite size of less than 1 micrometer, and wherein the $ZrO_2$ that is present as crystalline zirconia has an average crystallite size of less than 0.25 micrometer.

In another aspect, the present invention provides a method of abrading a surface, the method comprising:

contacting a plurality of abrasive grain with a surface (e.g., a surface of a substrate (e.g., a titanium substrate or a steel substrate such as carbon steel (e.g., a 1018 mild steel substrate), a stainless steel (e.g., 304 stainless steel) substrate, or a tool steel (e.g., 4140 steel and 4150 steel) substrate) at a contact pressure of at least 1 kg/cm$^2$, in some cases, preferably, 2 kg/cm$^2$, 3.5 kg/cm$^2$, 5 kg/cm$^2$, 7 kg/cm$^2$, 10 kg/cm$^2$, 15 kg/cm$^2$, and 20 kg/cm$^2$, wherein at least a portion of the abrasive grain is alpha alumina-based abrasive grain according to the present invention; and moving at least of one the plurality of abrasive grain or the surface relative to the other to abrade at least a portion of the surface with the abrasive grain. Preferably, at least 75 percent (or even 100 percent) by weight of the abrasive grain is abrasive grain according to the present invention. Examples of other substrate surfaces that can be abraded include paint, wood, and plastic.

Although not wanting to be bound by theory, it is believed that the presence of the $Al_2O_3$, $SiO_2$, and $ZrO_2$ and the crystallite size of the $Al_2O_3$ and $ZrO_2$ have a significant affect on its grinding performance. The small alpha alumina crystals are believed to result in a fast cutting, long lasting abrasive. The presence of zirconia and silica, are believed to aid in the densification of the alpha alumina and in minimizing the growth of the desirably small alpha alumina crystals, resulting in an abrasive grain that works well at higher pressures. In addition, it is believed that the presence of the zirconia may toughen the abrasive grain.

In another aspect, the present invention provides a method for making alpha alumina-based ceramic abrasive grain, the method comprising:

preparing a mixture (e.g., a dispersion) by combining components comprising liquid medium, zirconia source (e.g., a zirconia sol or a salt such as zirconyl acetate), silica source (e.g., a silica sol), and alumina source (preferably, boehmite);

converting the mixture to particulate alpha alumina-based ceramic abrasive grain precursor material; and sintering the precursor material to provide sintered alpha alumina-based abrasive grain according to the present invention. If the alumina source comprises particulate such as boehmite, alpha alumina powder, or gamma alumina powder, the components used to prepare the dispersion also include peptizing agent (e.g., an acid such as nitric acid).

In another aspect, the present invention provides a method for making alpha alumina-based ceramic abrasive grain, the method comprising:

preparing a mixture (e.g., a dispersion) by combining components comprising first liquid medium, silica source, alumina source (e.g., boehmite), and optionally zirconia source;

converting the mixture to particulate alpha alumina-based ceramic abrasive grain precursor material;

impregnating the precursor material with a composition comprising a mixture comprising a second liquid medium and a zirconia source; and sintering the impregnated precursor material to provide sintered alpha alumina-based abrasive grain according to the present invention. If the alumina source used in preparing the initial dispersion comprises particulate such as boehmite, alpha alumina powder, or gamma alumina powder, the dispersion also includes a peptizing agent (e.g., an acid such as nitric acid). Zirconia source for the initial mixture and the impregnating composition can be the same or different. Optionally, the impregnating composition further comprises other (i.e., other than a zirconia source) metal oxide source.

In this application:

"Boehmite" refers to alpha alumina monohydrate and boehmite commonly referred to in the art as "pseudo" boehmite (i.e., $Al_2O_3 \cdot xH_2O$, wherein x=1 to 2).

"Abrasive grain precursor" or "unsintered abrasive grain" refers to a dried alumina-based dispersion (i.e., "dried abrasive grain precursor") or a calcined alumina-based dispersion (i.e., "calcined abrasive grain precursor"), typically in the form of particles, that has a density of less than 80% (typically less than 60%) of theoretical, and is capable of being sintered or impregnated with an impregnation composition and then sintered to provide alpha alumina-based ceramic abrasive grain. "Alpha alumina-based ceramic abrasive" as used herein refers to a sintered abrasive grain that has been sintered to a density of at least 85% (preferably, at least 90% and more preferably, at least 95%) of theoretical, and contains, on a theoretical oxide basis, at least 60% by weight $Al_2O_3$, wherein at least 50% by weight of the total amount of alumina is present as alpha alumina.

"Nucleating material" refers to material that enhances the transformation of transitional alumina(s) to alpha alumina via extrinsic nucleation. The nucleating material can be a nucleating agent (i.e., material having the same or approximately the same crystalline structure as alpha alumina, or otherwise behaving as alpha alumina) itself (e.g., alpha alumina seeds, alpha $Fe_2O_3$ seeds, or alpha $Cr_2O_3$ seeds) or a precursor thereof. Other nucleating agents may include $Ti_2O_3$ (having a trigonal crystal structure), $MnO_2$ (having a rhombic crystal structure), $Li_2O$ (having a cubic crystal structure), and titanates (e.g., magnesium titanate and nickel titanate).

"Dispersion" or "sol" refers to a solid-in-liquid two-phase system wherein one phase comprises finely divided particles (in the colloidal size range) distributed throughout a liquid. A "stable dispersion" or "stable sol" refer to a dispersion or sol from which the solids do not appear by visual inspection to begin to gel, separate, or settle upon standing undisturbed for about 2 hours.

"Impregnation composition" refers to a solution or dispersion of a liquid medium, and a source of metal oxide that can be impregnated into an abrasive grain precursor. "Impregnated abrasive grain precursor" refers to a dried alumina-based dispersion (i.e., "impregnated dried abrasive grain precursor") or a calcined alumina-based dispersion (i.e., "impregnated calcined abrasive grain precursor") that has a density of less than 80% (typically less than 60%) of theoretical, and has been impregnated with an impregnation composition, and includes impregnated dried particles and impregnated calcined particles.

"Sintering" refers to a process of heating at a temperature below the melting temperature of the material being heated to provide densification and crystallite growth to provide a tough, hard, and chemically resistant ceramic material. The alpha alumina-based ceramic abrasive grain according to the present invention is not made by a fusion process wherein heating is carried out at a temperature above the melting temperature of the material being heated.

Typically, abrasive grain according to the present invention exhibit good grinding efficiencies under both relatively high and low pressure grinding conditions. Although not wanting to be bound by theory, it is believed that the use of nucleating material facilitates in obtaining alpha alumina crystals that are less than one micrometer in size. Further, it is believed that the presence of zirconia tends to assist in the densification and "toughening" of the alumina crystal matrix, thereby allowing the resulting abrasive grain being able to withstand the higher grinding forces. It is also believed that the addition of silica aids in the sintering process.

Abrasive grain according to the present invention can be incorporated into various abrasive articles such as coated abrasives, bonded abrasives (including vitrified and resinoid grinding wheels), nonwoven abrasives, and abrasive brushes. The abrasive articles typically comprise abrasive grain according to the present invention and binder.

BRIEF DESCRIPTION OF THE DRAWING

FIGS. 4 and 6 are elevational plan views of an extruder useful in the methods according to the present invention, while

DETAILED DESCRIPTION

Figure 1:
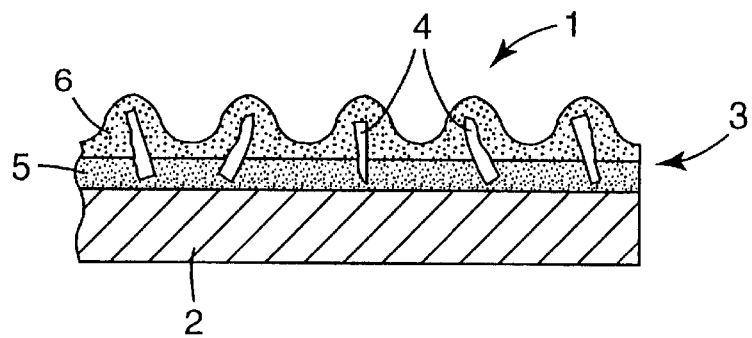
FIG. 1 is a fragmentary cross-sectional schematic view of a coated abrasive article including abrasive grain made according to the method of the present invention.

Preferably, the alumina source used to prepare the initial mixture is boehmite. Other suitable alumina sources that are capable of providing alpha alumina crystals during the sintering portion of the process include alpha alumina powders, gamma alumina powders, aluminum formoacetate, aluminum nitroformoacetate, and aluminum salts.

More specific examples of suitable aluminum compounds which can be used as alumina precursors include basic aluminum carboxylates, basic aluminum nitrates, partially hydrolyzed aluminum alkoxides or other aluminum salts and complexes. Preferred basic aluminum salts include those with carboxylate or nitrate counterions or mixtures of these salts. In the case of the basic aluminum carboxylates, these are of the general formula $Al(OH)_y(carboxylate)_{3-y}$, where y is between 1 and 2, preferably between 1 and 1.5, and the carboxylate counterion is selected from the group consisting of formate, acetate, propionate, and oxalate or combinations of these carboxylates. These materials can be prepared by digesting aluminum metal in a solution of the carboxylic acid as described in U.S. Pat. No. 3,957,598, the disclosure of which is incorporated herein by reference. The basic aluminum nitrates can also be prepared by digesting aluminum metal in a nitric acid solution as described in U.S. Pat. No. 3,340,205 or British patent 1,193,258, or by the thermal decomposition of aluminum nitrate as described in U.S. Pat. No. 2,127,504, the disclosures of which are incorporated herein by reference. These materials can also be prepared by partially neutralizing an aluminum salt with a base. The basic aluminum nitrates have the general formula $Al(OH)_z(NO_3)_{3-z}$, where z is between about 0.5 to 2.5.

Suitable boehmites include those commercially available under the trade designation "HIQ" (e.g., "HIQ-10," "HIQ-20," "HIQ-30," and "HIQ-40") from Alcoa Industrial Chemicals, and those commercially available under the trade designations of "DISPERAL" from Condea GmbH, Hamburg, Germany, and "DISPAL 23N480" and "CATAPAL D" from Condea Vista Company, Houston, Tex. These boehmites or alumina monohydrates are in the alpha form, and include relatively little, if any, hydrated phases other than monohydrates (although very small amounts of trihydrate impurities can be present in some commercial grade boehmite, which can be tolerated). They have a low solubility in water and have a high surface area (typically at least about 180 $m^2/g$). Preferably the dispersed boehmite used to make abrasive grain according to the present invention has an average crystallite size of less than about 20 nanometers (more preferably, less than 12 nanometers). In this context, "crystallite size" is determined by the 120 and 031 x-ray reflections.

The preferred liquid medium is typically water, although organic solvents, such as lower alcohols (typically $C_{1-6}$ alcohols), hexane, or heptane, may also be useful as the liquid medium. The water may be tap water, distilled water or deionized water. In some instances, it is preferable to heat the liquid medium (e.g., ls water) at (e.g., 30–70° C.) to improve the dispersibility of the boehmite, or other particulate material.

The dispersion may further comprise peptizing agents; these peptizing agents are generally soluble ionic compounds which are believed to cause the surface of a particle or colloid to be uniformly charged in a liquid medium (e.g., water). The preferred peptizing agents are acids or acid compounds. Examples of typical acids include monoprotic acids and acid compounds, such as acetic, hydrochloric, formic, and nitric acid, with nitric acid being preferred. The amount of acid used depends, for example, on the dispersibility of the particulate alumina source, the percent solids of the dispersion, the components of the dispersion, the amounts, or relative amounts of the components of the dispersion, the particle sizes of the components of the dispersion, and/or the particle size distribution of the components of the dispersion. For boehmite, the dispersion typically contains at least, 0.1 to 20%, preferably 1% to 10% by weight acid, and most preferably 3 to 8% by weight acid, based on the weight of boehmite in the dispersion.

In some instances, the acid may be applied to the surface of the boehmite particles prior to being combined with the water. The acid surface treatment may provide improved dispersibility of the boehmite in the water.

The silica source is preferably added to the alumina dispersion as a colloidal sol. The colloidal silica comprises finely divided particles of amorphous or crystalline silica typically having one or more of their dimensions within a range of about 3 nanometers to about 1 micrometer. The average silica particle size in the colloidal is preferably less than about 150 nanometers, more preferably less than about 100 nanometers, and most preferably less than about 50 nanometers. In most instances, the silica particles can be on the order of about 3–15 nanometers. In most instances, the colloidal silica comprises a distribution or range of metal oxide particle sizes. Silica sols are available, for example, from Nalco of Naperville, Ill.; and Eka Nobel of Augusta, Ga. Silica sols include those available under the trade designations "NALCO 1115," "NALCO 1130," "NALCO 2326," "NALCO 1034A," and "NALCOAG 1056" from Nalco Products, Inc. of Naperville, Ill., wherein the latter two are examples of acidic silica sols; and "NYACOL 215"

from Eka Nobel, Inc. For additional information on silica sols see, for example, U.S. Pat. No. 5,611,829 (Monroe et al.) and U.S. Pat. No. 5,645,619 (Erickson et al.), the disclosures of which are incorporated herein by reference.

It is preferred to include a nucleating material or agent in the boehmite dispersion. One preferred nucleating material for practicing the present invention includes iron oxide or an iron oxide precursor. Sources of iron oxide, which in some cases may act as or provide a material that acts as a nucleating material, include hematite (i.e., $\alpha$-$Fe_2O_3$), as well as precursors thereof (i.e., goethite ($\alpha$-FeOOH), lepidocrocite ($\gamma$-FeOOH), magnetite ($Fe_3O_4$), and maghemite ($\gamma$-$Fe_2O_3$)). Suitable precursors of iron oxide include iron-containing material that, when heated, will convert to $\alpha$-$Fe_2O_3$. For additional details regarding the addition of iron sources to the dispersion or ceramic precursor material see, for example, U.S. Pat. No. 5,611,829 (Monroe et al.) and U.S. Pat. No. 5,645,619 (Erickson et al.), the disclosures of which are incorporated herein by reference.

Other suitable nucleating materials may include $\alpha$-$Cr_2O_3$ precursors such as chromium nitrate ($Cr(NO_3)_3 \cdot 9H_2O$) and chromium acetate; $MnO_2$ precursors such as manganese nitrate ($Mn(NO_3)_2 \cdot 4H_2O$), manganese acetate, and manganese formate; and $Li_2O$ precursors such as lithium nitrate ($LiNO_3$), lithium acetate, and lithium formate. Additional details regarding nucleating materials are also disclosed, for example, in U.S. Pat. No. 4,623,364 (Cottringer et al.), U.S. Pat. No. 4,744,802 (Schwabel), U.S. Pat. No. 4,964,883 (Morris et al.), U.S. Pat. No. 5,139,978 (Wood), and U.S. Pat. No. 5,219,806 (Wood), the disclosures of which are incorporated herein by reference.

Suitable zirconia sources include zirconium salts and zirconia sols, although the zirconia source in an impregnation composition is typically a zirconium salt that forms a solution in the liquid medium. Examples of zirconium salts include zirconyl acetate ($ZrO(CH_3COO)_2$), zirconium oxynitrate ($ZrO(NO_3)_2 \cdot xH_2O$), zirconium hydroxynitrate, zirconium formate, and zirconium acetylacetonate, zirconium alkoxides (butoxide, ethoxide, propoxide, tert-butoxide), zirconium chloride, zirconium nitrate, ammonium complex, zirconium tetrachloride, zirconium oxychloride octahydrate. The zirconia sol comprises finely divided particles of amorphous or crystalline zirconia typically having one or more of their dimensions preferably within a range of about 3 nanometers to about 250 nanometers. The average zirconia particle size in the colloidal zirconia is preferably less than about 150 nanometers, more preferably less than about 100 nanometers, and most preferably less than about 50 nanometers. In some instances, the zirconia particles can be on the order of about 3–10 nanometers. In most instances, the colloidal zirconia comprises a distribution or range of zirconia particle sizes. Zirconia sols include those available from Nyacol Products, Inc., Ashland, Mass. under the trade designations "ZR10/20" and "ZR100/20". For more information on zirconia sols, see, for example, U.S. Pat. Nos. 5,498,269 (Larmie) and U.S. Pat. No. 5,551,963 (Larmie), the disclosures of which are incorporated herein by reference.

The amount of the alumina source, silica source, nucleating material, and zirconia source in the initial dispersion, and/or provided by the impregnation composition, is selected to provide the desired weight percentages in the sintered abrasive grain.

Typically, abrasive grain according to the present invention comprise, on a theoretical metal oxide basis, about 55 to about 99 percent by weight (preferably, about 65 to 95 percent by weight; more preferably, about 70 to about 93 percent by weight; and even more preferably about 80 to 93 percent by weight) $Al_2O_3$, about 0.1 to about 10 percent by weight (preferably, about 0.5 to about 5 percent by weight; more preferably, about 0.75 to about 3 percent by weight; and even more preferably, about 1 to about 2 percent by weight) $SiO_2$, and about 0.5 to about 15 percent by weight (preferably, about 1 to about 13; more preferably, about 3 to about 10 percent by weight, and even more preferably, about 5 to about 10 percent by weight) $ZrO_2$, based on the total metal oxide content of the abrasive grain. Further the abrasive grain typically comprises, on theoretical metal oxide basis, about 0.1 to about 10 (preferably, about 0.5 to about 10 percent by weight; more preferably, about 0.75 to about 5; and even more preferably, about 1 to about 3 percent by weight) nucleating agent, based on the total metal oxide content of the abrasive grain.

The initial mixture may further comprise other metal oxide sources (i.e., materials that are capable of being converting into metal oxide with the appropriate heating conditions), sometimes referred to as a metal oxide modifiers. Such metal oxide modifiers may alter the physical properties and/or chemical properties of the resulting abrasive grain. The amount of these other metal oxides incorporated into the initial mixture and/or impregnation composition may depend, for example, on the desired composition and/or properties of the sintered abrasive grain, as well as on the effect or role the additive may have on or play in the process used to make the abrasive grain.

The other metal oxides may be added to the initial mixture as a metal oxide (e.g., a colloidal suspension or a sol) and/or as a precursor (e.g., a metal salt such as metal nitrate salts, metal acetate salts, metal citrate salts, metal formate salts, and metal chloride salts). For metal oxide particles, it is generally preferred that the metal oxide particles are generally less than 5 micrometers, preferably less than 1 micrometer in size. The colloidal metal oxides are discrete finely divided particles of amorphous or crystalline metal oxide typically having one or more of their dimensions within a range of about 3 nanometers to about 1 micrometer. Preferably, the "colloidal metal oxide sols" are a stable (i.e., the metal oxide solids in the sol or dispersion do not appear by visual inspection to begin to gel, separate, or settle upon standing undisturbed for about 2 hours) suspension of colloidal particles (preferably in a liquid medium having a pH of less than 6.5).

Examples of such other metal oxides include: praseodymium oxide, dysprosium oxide, samarium oxide, cobalt oxide, zinc oxide, neodymium oxide, yttrium oxide, ytterbium oxide, magnesium oxide, nickel oxide, manganese oxide, lanthanum oxide, gadolinium oxide, sodium oxide, dysprosium oxide, europium oxide, hafnium oxide, and erbium oxide, as well as manganese oxide, chromium oxide, titanium oxide, and ferric oxide which may or may not function as nucleating agents.

Metal oxide precursors include metal nitrate salts, metal acetate salts, metal citrate salts, metal formate salts, and metal chloride salts. Metal nitrate, acetate, citrate, formate, and chloride salts can be made by techniques known in the art, or obtained from commercial sources such as Alfa Chemicals of Ward Hill, Mass. and Mallinckrodt Chemicals of Paris, Ky. Examples of nitrate salts include magnesium nitrate ($Mg(NO_3)_2 \cdot 6H_2O$), cobalt nitrate ($Co(NO_3)_2 \cdot 6H_2O$), nickel nitrate $Ni(NO_3)_2 \cdot 6H_2O$), lithium nitrate ($LiNO_3$), manganese nitrate ($Mn(NO_3)_2 \cdot 4H_2O$), chromium nitrate ($Cr(NO_3)_3 \cdot 9H_2O$), yttrium nitrate ($Y(NO_3)_3 \cdot 6H_2O$), praseodymium nitrate ($Pr(NO_3)_3 \cdot 6H_2O$), samarium nitrate ($Sm(NO_3)_3 \cdot 6H_2O$), neodymium nitrate ($Nd(NO_3)_3 \cdot 6H_2O$), lanthanum nitrate ($La(NO_3)_3 \cdot 6H_2O$), gadolinium nitrate ($Gd(NO_3)_3 \cdot 5H_2O$), dysprosium nitrate ($Dy(NO_3)_3 \cdot 5H_2O$), europium nitrate ($Eu(NO_3)_3 \cdot 6H_2O$), ferric nitrate ($Fe(NO_3)_3 \cdot 9H_2O$), zinc nitrate ($Zn(NO_3)_3 \cdot 6H_2O$), and erbium nitrate ($Er(NO_3)_3 \cdot 5H_2O$). Examples of metal acetate salts include magnesium acetate, cobalt acetate, nickel acetate, lithium acetate, manganese acetate, chromium acetate, yttrium acetate, praseodymium acetate, samarium acetate, ytterbium acetate, neodymium acetate, lanthanum acetate, gadolinium acetate, and dysprosium acetate. Examples of citrate salts include magnesium citrate, cobalt citrate, lithium citrate, and manganese citrate. Examples of formate salts include magnesium formate, cobalt formate, lithium formate, manganese formate, and nickel formate.

Typically, the use of a metal oxide modifier may decrease the porosity of the sintered abrasive grain and thereby increase the density. Additionally certain metal oxide precursors (e.g., nucleating materials which are, or transform into, nucleating agents, or materials that otherwise behave as nucleating agents) may reduce the temperature at which the transitional aluminas transform into alpha alumina. Certain metal oxides may react with the alumina to form a reaction product and/or form crystalline phases with the alpha alumina which may be beneficial during use of the abrasive grain in abrading applications. Thus the selection and amount of metal oxide will depend in part upon the processing conditions and the desired abrading properties of the abrasive grain.

The oxides of cobalt, nickel, zinc, and magnesium, for example, typically react with alumina to form a spinel, whereas zirconia and hafnia typically do not react with the alumina. Alternatively, for example, the reaction products of dysprosium oxide and gadolinium oxide with aluminum oxide are generally garnet. The reaction products of praseodymium oxide, ytterbium oxide, erbium oxide, and samarium oxide with aluminum oxide generally have a perovskite and/or garnet structure. Yttria can also react with the alumina to form $Y_3Al_5O_{12}$ having a garnet crystal structure. Certain rare earth oxides and divalent metal cations react with alumina to form a rare earth aluminate represented by the formula $LnMAl_{11}O_{19}$, wherein Ln is a trivalent metal ion such as $La^{3+}$, $Nd^{3+}$, $Ce^{3+}$, $Pr^{3+}$, $Sm^{3+}$, $Gd^{3+}$, $Er^{3+}$, or $Eu^{3+}$, and M is a divalent metal cation such as $Mg^{2+}$, $Mn^{2+}$, $Ni^{2+}$, $Zn^{2+}$, or $Co^{2+}$. Such aluminates have a hexagonal crystal structure. For additional details regarding the inclusion of metal oxide (and/or precursors thereof) in a boehmite dispersion see, for example, in U.S. Pat. No. 4,314,827 (Leitheiser et al.), U.S. Pat. No. 4,770,671 (Monroe et al.), U.S. Pat. No. 4,881,951 (Wood et al.), U.S. Pat. No. 5,429,647 (Larmie), U.S. Pat. No. 5,498,269 (Larmie), and U.S. Pat. No. 5,551,963 (Larmie), the disclosures of which are incorporated herein by reference.

Alumina-based dispersions (e.g., boehmite-based dispersions) utilized in the practice of the present invention typically comprise greater than 15% by weight (generally from greater than 20% to about 80% by weight; typically greater than 30% to about 80% by weight) solids (or alternatively boehmite), based on the total weight of the dispersion. Certain preferred dispersions, however, comprise 35% by weight or more, 45% by weight or more, 50% by weight or more, 55% by weight or more, 60% by weight or more and 65% by weight or more by weight or more solids (or alternatively boehmite), based on the total weight of the dispersion. Weight percents of solids and boehmite above about 80 wt-% may also be useful, but tend to be more difficult to process to make the abrasive grain provided by the method according to the present invention.

General procedures for making sintered alpha alumina-based abrasive grain are disclosed for example, in U.S. Pat. No. 4,518,397 (Leitheiser et al.), U.S. Pat. No. 4,770,671 (Monroe), U.S. Pat. No. 4,744,802 (Schwabel), U.S. Pat. No. 5,139,978 (Wood), U.S. Pat. No. 5,219,006 (Wood), and U.S. Pat. No. 5,593,647 (Monroe), the disclosures of which are incorporated herein by reference.

The (initial) mixture is typically prepared by adding the various it. components and then mixing them together to provide a homogenous mixture. For example, boehmite is typically added to water that has been mixed with nitric acid. The other components are added before, during, or after the boehmite is added. However, if the nucleating material is an aqueous, acidic dispersion of iron oxyhydroxide and the silica source is a basic colloidal silica sol, it is preferable not to add the two together, but rather to add each individually to acidified water prior to, preferably, after other components, such as the boehmite, have been added to the acidified water.

A high solids dispersion is typically, and preferably, prepared by gradually adding a liquid component(s) to a component(s) that is non-soluble in the liquid component(s), while the latter is mixing or tumbling. For example, a liquid containing water, nitric acid, and metal salt may be gradually added to boehmite, while the latter is being mixed such that the liquid is more easily distributed throughout the boehmite.

Suitable mixers include pail mixers, sigma blade mixers, ball mill and high shear mixers. Other suitable mixers may be available from Eirich Machines, Inc. of Gurnee, Ill.; Hosokawa-Bepex Corp. of Minneapolis, Minn. (including a mixer available under the trade designation "SCHUGI FLEX-O-MIX", Model FX-160); and Littleford-Day, Inc. of Florence, Ky.

Boehmite-based dispersions may be heated to increase the dispersibility of the alpha alumina monohydrate and/or to create a homogeneous dispersion. The temperature may vary to convenience, for example the temperature may range from about 20° C. to 80° C., usually between 25° C. to 75° C. Alternatively, the dispersion may be heated under a pressure ranging from 1.5 to 130 atmospheres of pressure.

Boehmite-based dispersions typically gel prior to, or during, drying. The addition of most modifiers may result in the dispersion gelling faster. Alternatively, ammonium acetate or other ionic species may be added to induce gelation of the dispersion. The pH of the dispersion and concentration of ions in the gel generally determines how fast the dispersion gels. Typically, the pH of the dispersion is within a range of about 1.5 to about 5.

The dispersion may be extruded. It may be preferable to extrude (typically a dispersion where at least 50 percent by weight of the alumina content is provided by particulate (e.g., boehmite), including in this context a gelled dispersion, or even partially deliquified dispersion. The extruded dispersion, referred to as extrudate, can be extruded into elongated precursor material (e.g., rods (including cylindrical rods and elliptical rods)). After firing, the rods may have an aspect ratio between 1.5 to 10, preferably between 2 to 6. Alternatively the extrudate may be in the form of a very thin sheet, see for example U.S. Pat. No. 4,848,041 (Kruschke) herein after incorporated in by reference. Examples of suitable extruders include ram extruders, single screw, twin screw, and segmented screw extruders. Suitable extruders are available, for example, from Loomis Products of Levitown, Pa., Bonnot Co. of Uniontown, Ohio., and Hosokawa-Bepex of Minneapolis, Minn., which offers, for example, an extruder under the trade designation "EXTRUD-O-MIX" (Model EM-6).

Preferably, the dispersion is compacted, for example, prior to or during extrusion (wherein the extrusion step may inherently involve compaction of the dispersion). In compacting the dispersion, it is understood that the dispersion is subjected to a pressure or force such as experienced, for example, in a pellitizer or die press (including mechanical, hydraulic and pneumatic or presses) or an extruder (i.e., all or substantially all of the dispersion experiences the specified pressure). In general, compacting the dispersion reduces the amount of air or gases entrapped in the dispersion, which in turn generally produces a less porous microstructure, that is more desirable. Additionally the compaction step results an easier means to continuously feed the extruder and thus may save on labor producing the abrasive grain.

If the elongated precursor material is a rod, it preferably has a diameter such that the sintered abrasive grain will have a diameter of, for example, about 150–5000 micrometers, and preferably, an aspect ratio (i.e., length to width ratio) of at least 2.5:1, at least 4:1, or even at least 5:1. The rod may have any cross sectional shape including a circle, an oval, a star shape, a tube and the like. The rod abrasive grain may also be curved.

Figure 4:
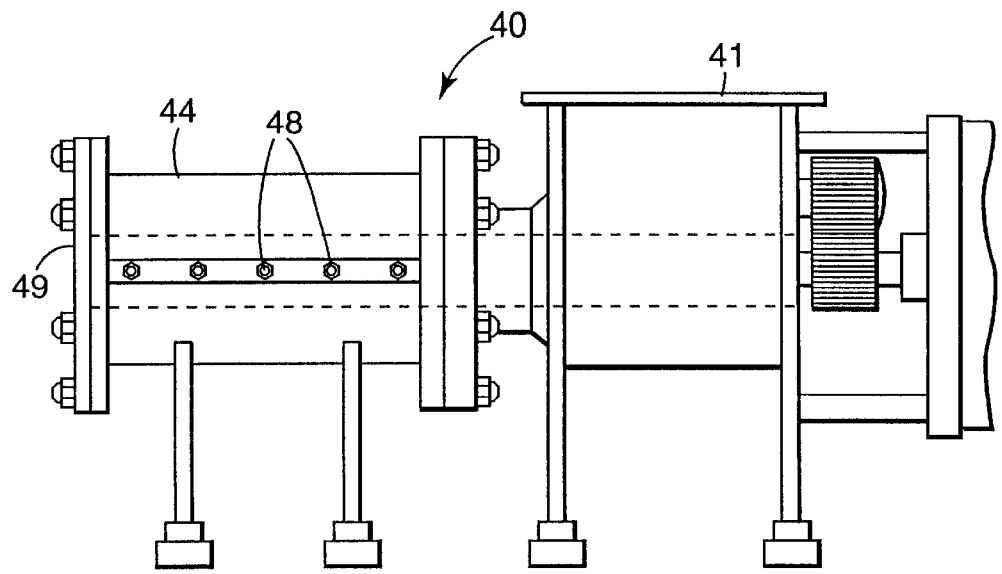
Figure 5:
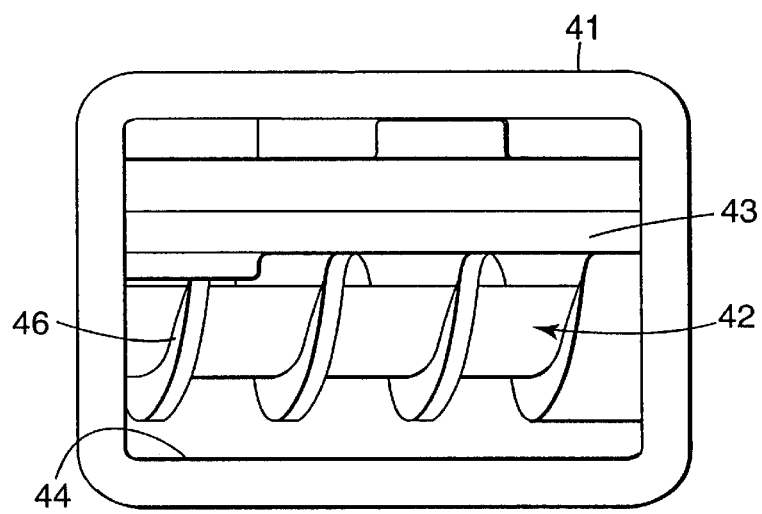
FIG. 5 is an enlarged top plan of the extruder feed port.
Figure 6:
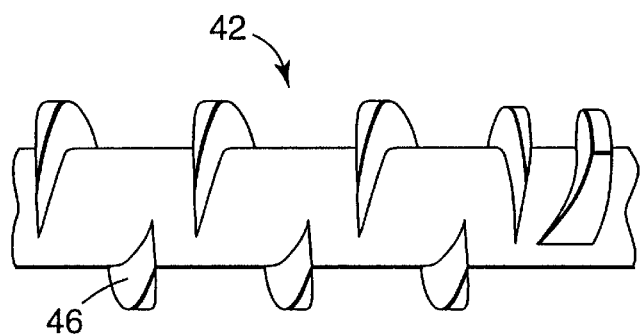

A preferred apparatus for compacting the dispersion (gelled or not) is illustrated in FIGS. 4–6. Modified segmented screw extruder 40, has feed port 41 and auger 42 centrally placed within barrel 44. FIG. 5 is a view of the interior of extruder 40 looking through feed port 41. Barrel 44 has grooves (not shown; generally known as "lands") running parallel down its length. Pins 48 extend centrally into barrel 44. Further, helical flight 46 extends the length of auger 42. Flight 46 is not continuous down the length of auger 42 but is segmented so that flight 46 on auger 42 does not come into contact with pins 48.

The dispersion (including in this context gelled dispersion) (not shown) is fed in feed port 41. Packer screw 43 urges the dispersion against auger 42 so that the dispersion is compacted by auger 42 and extruded through die 49. Die 49 can have a variety of apertures or holes therein (including a single hole or multiple holes). The die apertures can be any of a variety of cross sectional shapes, including a circle or polygon shapes (e.g., a square, star, diamond, trapezoid, or triangle). The die apertures can be any of a variety of sizes, but typically range from about 0.5 mm (0.02 inch) to 1.27 cm (0.5 inch), and more typically, from about 0.1 cm (0.04 inch) to about 0.8 cm (0.3 inch).

The extruded dispersion can be can be cut or sliced, for example, to provide discrete particles, and/or to provide particles having a more uniform length. Examples of methods for cutting (or slicing) the dispersion include rotary knife, blade cutters and wire cutters. The compacted dispersion can also be shredded and/or grated.

In general, techniques for drying the dispersion are known in the art, including heating to promote evaporation of the liquid medium, or simply drying in air. The drying step generally removes a significant portion of the liquid medium from the dispersion; however, there still may be a minor portion (e.g., about 10% or less by weight) of the liquid medium present in the dried dispersion. Typical drying conditions include temperatures ranging from about room temperature to over about 200° C., typically between 50 to 150° C. The times may range from about 30 minutes to over days. To minimize salt migration, it may be desirable to dry the dispersion at low temperature.

After drying, the dried mixture (e.g., dispersion) may be converted into precursor particles. One typical means to generate these precursor particles is by a crushing technique. Various crushing or comminuting techniques may be employed such as a roll crusher, jaw crusher, hammer mill, ball mill and the like. Coarser particles may be recrushed to generate finer particles. It is also preferred that the dried dispersion be crushed, as, for example, it is generally easier to crush dried gel versus the sintered alpha alumina based abrasive grain.

Alternatively, for example, the mixture may be converted into precursor particles prior to drying. This may occur for instance if the mixture is processed into a desired grit shape and particle size distribution. For example, the dispersion may be extruded into rods that are subsequently cut to the desired lengths and then dried. Alternatively, the mixture may be molded into a triangular shape particle and then dried. Additional details concerning triangular shaped particles may be found in U.S. Pat. No. 5,201,916 (Berg et al.), the disclosure of which is incorporated herein by reference.

Alternatively, for example, the dried mixture (e.g., dispersion) is shaped into lumps with a high volatilizable content which then are explosively comminuted by feeding the lumps directly into a furnace held at a temperature above 350° C., usually a temperature between 600° C. to 900° C.

Typically, the dried mixture is calcined, prior to sintering, although a calcining step is not always required. In general, techniques for calcining the dried mixture or ceramic precursor material, wherein essentially all the volatiles are removed, and the various components that were present in the dispersion are transformed into oxides, are known in the art. Such techniques include using a rotary or static furnace to heat dried mixture at temperatures ranging from about 400–1000° C. (typically from about 450–800° C.) until the free water, and typically until at least about 90 wt-% of any bound volatiles are removed.

It is also within the scope of the present invention, and a part of at least one method according to the present invention, to impregnate a metal oxide modifier source (typically a metal oxide precursor) into a calcined precursor particle. For example, in at least one method according to the present invention, zirconia precursor (e.g., a zirconium salt) can be impregnated into precursor material. Typically, the metal oxide precursors are in the form metal salts. These metal oxide precursors and metal salts are described above with respect to the initial mixture.

Methods of impregnating sol gel-derived particles are described in general, for example, in U.S. Pat. No. 5,164,348 (Wood), the disclosure of which is incorporated herein by reference. In general, ceramic precursor material (i.e., dried alumina-based mixture (or dried ceramic precursor material), or calcined alumina-based mixture (or calcined ceramic precursor material)) is porous. For example, a calcined ceramic precursor material typically has pores about 2–15 nanometers in diameter extending therein from an outer surface. The presence of such pores allows an impregnation composition comprising a mixture comprising liquid medium (typically water) and appropriate metal precursor to enter into ceramic precursor material. The metal salt material is dissolved in a liquid, and the resulting solution mixed with the porous ceramic precursor particle material. The impregnation process is thought to occur through capillary action.

The liquid used for the impregnating composition is preferably water (including deionized water), an organic solvent, and mixtures thereof. If impregnation of a metal salt is desired, the concentration of the metal salt in the liquid medium is typically in the range from about 5% to about 40% dissolved solids, on a theoretical metal oxide basis). Preferably, there is at least 50 ml of solution added to achieve impregnation of 100 grams of porous precursor particulate material, more preferably, at least about 60 ml of solution to 100 grams of precursor particulate material.

After the impregnation, the resulting impregnated precursor particle is typically calcined to remove any volatiles prior to sintering. The conditions for this calcining step are described above.

After the precursor particle is formed or optionally calcined, the precursor particle is sintered to provide a dense, ceramic alpha alumina based abrasive grain. In general, techniques for sintering the precursor material, which include heating at a temperature effective to transform transitional alumina(s) into alpha alumina, to causing all of the metal oxide precursors to either react with the alumina or form metal oxide, and increasing the density of the ceramic material, are known in the art. The precursor material may be sintered by heating (e.g., using electrical resistance, microwave, plasma, laser, or gas combustion, on batch basis or a continuous basis. Sintering temperatures are usually range from about 1200° C. to about 1650° C.; typically, from about 1200° C. to about 1500° C.; more typically, less than 1400° C. The length of time which the precursor material is exposed to the sintering temperature depends, for example, on particle size, composition of the particles, and sintering temperature. Typically, sintering times range from a few seconds to about 60 minutes (preferably, within about 3–30 minutes). Sintering is typically accomplished in an oxidizing atmosphere, although inert or reducing atmospheres may also be useful.

The longest dimension of the alpha alumina-based abrasive grain is typically at least about 1 micrometer. The abrasive grain described herein can be readily made with a length of greater than about 50 micrometers, and larger abrasive grain (e.g., greater than about 1000 micrometers or even greater than about 5000 micrometers) can also be readily made. Generally, the preferred abrasive grain has a length in the range from about 100 to about 5000 micrometers (typically in the range from about 100 to about 3000 micrometers), although other sizes are also useful, and may even be preferred for certain applications. In another aspect, abrasive grain according to the present invention, typically have an aspect ratio of at least 1.2:1 or even 1.5:1, sometimes at least 2:1, and alternatively, at least 2.5:1.

Dried, calcined, and/or sintered materials provided during or by the method according to the present invention, are typically screened and graded using techniques known in the art. For example, the dried particles are typically screened to a desired size prior to calcining. Sintered abrasive grain are typically screened and graded prior to use in an abrasive application or incorporation into an abrasive article.

Screening and grading of abrasive grain made according to the method of the present invention can be done, for example, using the well known techniques and standards for ANSI (American National Standard Institute), FEPA (Federation Europeenne des Fabricants de Products Abrasifs), or JIS (Japanese Industrial Standard) grade abrasive grain.

It is also within the scope of the present invention to recycle unused (typically particles too small in size to provide the desired size of sintered abrasive grain) deliquified mixture (typically dispersion) material as generally described, for example, in U.S. Pat. No. 4,314,827 (Leitheiser et al.), the disclosure of which is incorporated herein by reference. For example, a first dispersion can be made as described above, dried, crushed, and screened, and then a second dispersion made by combining, for example, liquid medium (preferably, aqueous), boehmite, and deliquified material from the first dispersion, and optionally metal oxide and/or metal oxide precursor. The recycled material may provide, on a theoretical metal oxide basis, for example, at least 10 percent, at least 30 percent, at least 50 percent, or even up to (and including) 100 percent of the theoretical $Al_2O_3$ content of the dispersion which is deliquified and converted (including calcining and sintering) to provide the sintered abrasive grain.

In one aspect of the invention, the abrasive grain may be processed such that it is "sharp". The term sharp is known to one skilled in the abrasive grain art. In general, a sharp abrasive grain is elongated in shape, preferably needle-like. Another way to describe a sharp abrasive grain is a grain that is in the form of sliver or shard. A sharp abrasive grain does not have a blocky shape associated with it. It is preferred that the sharp abrasive grain have "pointy" ends (i.e., the faces forming the ends of the abrasive grain meet at a point). Additionally, it is preferred that the sharp abrasive grain has angular faces. In some abrading applications, relatively sharp abrasive grain may be preferred.

There are several techniques to measure the sharpness of an abrasive grain, including bulk density and aspect ratio. The bulk density of the abrasive grain can be measured, for example, in accordance with ANSI Standard B74.4-1992, published November, 1992, the disclosure of which is incorporated herein by reference.

The aspect ratio, which is also an indication of sharpness, is determined as the length of an abrasive grain divided by the cross sectional width. Typically, sharp abrasive grain have an aspect ratio of at least one to one, preferably at least about 1.5 to 1 and preferably about 2 to 1. In some instances, the aspect ratio may be greater than 3 to 1.

It is also within the scope of the present invention to coat the abrasive grain with a surface coating such as described in U.S. Pat. No. 1,910,440 (Nicholson), U.S. Pat. No. 3,041,156 (Rowse), U.S. Pat. No. 5,009,675 (Kunz et al.), U.S. Pat. No. 4,997,461 (Markhoff-Matheny et al.), and U.S. Pat. No. 5,042,991 (Kunz et al.), U.S. Pat. No. 5,011,508 (Wald et al.), and U.S. Pat. No. 5,213,591 (Celikkaya et al.), the disclosures of which are incorporated herein by reference.

Abrasive grain according to the present invention can be used in conventional abrasive products, such as coated abrasive products, bonded abrasive products (including vitrified and resinoid grinding wheels, cutoff wheels, and honing stones), nonwoven abrasive products, and abrasive brushes. Typically, abrasive products (i.e., abrasive articles) include binder and abrasive grain, at least a portion of which is abrasive grain according to the present invention, secured within the abrasive product by the binder. Methods of making such abrasive products and using abrasive products are well known to those skilled in the art. Furthermore, abrasive grain according to the present invention can be used in abrasive applications that utilize slurries of abrading compounds (e.g., polishing compounds).

Coated abrasive product generally include a backing, abrasive grain, and at least one binder to hold the abrasive grain onto the backing. The backing can be any suitable material, including cloth, polymeric film, fibre, nonwoven webs, paper, combinations thereof, and treated versions thereof. The binder can be any suitable binder, including an inorganic or organic binder. The abrasive grain can be present in one layer or in two layers of the coated abrasive product. Methods of making coated abrasive products are described, for example, in U.S. Pat. No. 4,734,104 (Broberg), U.S. Pat. No. 4,737,163 (Larkey), U.S. Pat. No. 5,203,884 (Buchanan et al.), U.S. Pat. No. 5,378,251 (Culler et al.), U.S. Pat. No. 5,417,726 (Stout et al.), U.S. Pat. No. 5,436,063 (Follett et al.), U.S. Pat. No. 5,496,386 (Broberg et al.), and U.S. Pat. No. 5,520,711 (Helmin), the disclosures of which are incorporated herein by reference.

An example of a coated abrasive product is depicted in FIG. 1. Referring to this figure, coated abrasive product 1 has a backing (substrate) 2 and abrasive layer 3. Abrasive layer 3 includes abrasive grain 4 secured to a major surface of backing 2 by make coat 5 and size coat 6. In some instances, a supersize coat (not shown) is used.

Figure 2:
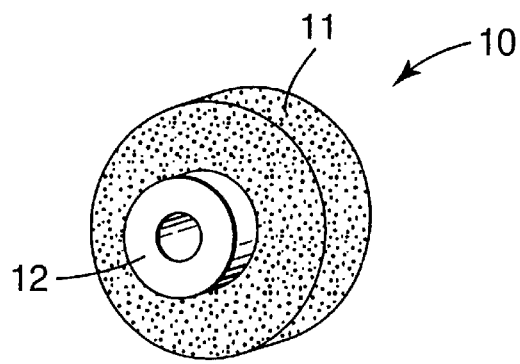
FIG. 2 is a perspective view of a bonded abrasive article including abrasive grain made according to the method of the present invention.

Bonded abrasive products typically include a shaped mass of abrasive grain held together by an organic, metallic, or vitrified binder. Such shaped mass can be, for example, in the form of a wheel, such as a grinding wheel or cutoff wheel. It can also be in the form, for example, of a honing stone or other conventional bonded abrasive shape. It is typically in the form of a grinding wheel. Referring to FIG. 2, grinding wheel 10 is depicted, which includes abrasive grain 11, at least a portion of which is abrasive grain according to the present invention, molded in a wheel and mounted on hub 12. For further details regarding bonded abrasive products, see, for example, U.S. Pat. No. 4,997,461 (Markhoff-Matheny et al.) and U.S. Pat. No. 4,898,597 (Hay et al.), the disclosures of which are incorporated herein by reference.

Figure 3:
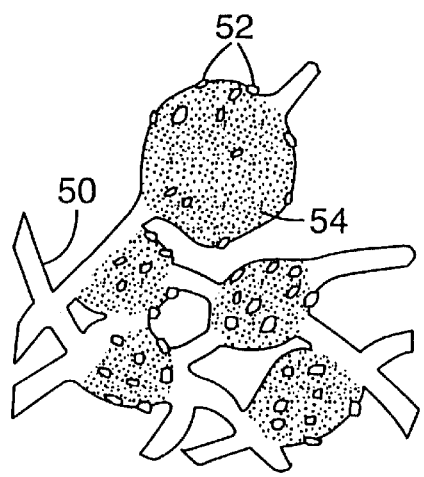
FIG. 3 is an enlarged schematic view of a nonwoven abrasive article including abrasive grain made according to the method of the present invention.

Nonwoven abrasive products typically include an open porous lofty polymer filament structure having abrasive grain distributed throughout the structure and adherently bonded therein by an organic binder. Examples of filaments include polyester fibers, polyamide fibers, and polyaramid fibers. In FIG. 3, a schematic depiction, enlarged about 100x, of a typical nonwoven abrasive product is provided. Such a nonwoven abrasive product comprises fibrous mat 50 as a substrate, onto which abrasive grain 52, at least a portion of which is abrasive grain according to the present invention, are adhered by binder 54. For further details regarding nonwoven abrasive products, see, for example, U.S. Pat. No. 2,958,593 (Hoover et al.), the disclosure of which is incorporated herein by reference.

Useful abrasive brushes include those having a plurality of bristles unitary with a backing (see, e.g., U.S. Pat. No. 5,679,067 (Johnson et al.), the disclosure of which is incorporated herein by reference). Preferably, such brushes are made by injection molding a mixture of polymer and abrasive grain.

Suitable organic binders for the abrasive products include thermosetting organic polymers. Examples of suitable thermosetting organic polymers include phenolic resins, urea-formaldehyde resins, melamine-formaldehyde resins, urethane resins, acrylate resins, polyester resins, aminoplast resins having pendant α,β-unsaturated carbonyl groups, epoxy resins, and combinations thereof. The binder and/or abrasive product can also include additives such as fibers, lubricants, wetting agents, thixotropic materials, surfactants, pigments, dyes, antistatic agents (e.g., carbon black, vanadium oxide, graphite, etc.), coupling agents (e.g., silanes, titanates, zircoaluminates, etc.), plasticizers, suspending agents, and the like. The amounts of these optional additives are selected to provide the desired properties. The coupling agents can improve adhesion to the abrasive grain and/or filler.

The binder can also contain filler materials or grinding aids, typically in the form of a particulate material. Typically, the particulate materials are inorganic materials. Examples of particulate materials that act as fillers include metal carbonates, silica, silicates, metal sulfates, metal oxides, and the like. Examples of particulate materials that act as grinding aids include: halide salts such as sodium chloride, potassium chloride, sodium cryolite, and potassium tetrafluoroborate; metals such as tin, lead, bismuth, cobalt, antimony, iron, and titanium; organic halides such as polyvinyl chloride and tetrachloronaphthalene; sulfur and sulfur compounds; graphite; and the like. A grinding aid is a material that has a significant effect on the chemical and physical processes of abrading, which results in improved performance. In a coated abrasive product, a grinding aid is typically used in the supersize coat applied over the surface of the abrasive grain, although it can also be added to the size coat. Typically, if desired, a grinding aid is used in an amount of about 50–300 g/m$^2$ (preferably, about 80–160 g/m$^2$) of coated abrasive product.

The abrasive products can contain 100% abrasive grain according to the present invention, or they can contain a blend of such abrasive grain with conventional abrasive grain and/or diluent particles. However, at least about 5% by weight, and preferably about 30–100% by weight, of the abrasive grain in the abrasive products should be abrasive grain according to the present invention. Examples of suitable conventional abrasive grain include fused aluminum oxide, silicon carbide, diamond, cubic boron nitride, garnet, fused alumina zirconia, and other sol-gel abrasive grain, and the like. Examples of suitable diluent particles include marble, gypsum, flint, silica, iron oxide, aluminum silicate, glass, and diluent agglomerates. Abrasive grain according to the present invention can also be combined in or with abrasive agglomerates. An example of an abrasive agglomerate is described in U.S. Pat. No. 4,311,489 (Kressner), U.S. Pat. No. 4,652,275 (Bloecher et al.), and U.S. Pat. No. 4,799,939 (Bloecher et al.), the disclosures of which are incorporated herein by reference.

EXAMPLES

This invention is further illustrated by the following examples, but the particular materials and amounts thereof recited in these examples, as well as other conditions and details, should not be construed to unduly limit this invention. Various modifications and alterations of the invention will become apparent to those skilled in the art. All parts and percentages are by weight unless otherwise indicated.

Any reference to the percent solids levels of the dispersion used in the following examples are the approximate solids levels, as they do not take into account the 2–6% water commonly found on the surface of boehmite, nor the solids provided by any non-boehmite additives.

The following designations are used in the examples:

| | |
|---|---|
| AAMH | alpha-alumina monohydrate (boehmite) (obtained from Condea Chemie, Hamburg, Germany, under the trade designation "DISPERAL"); dispersability value: 99.0% |
| DWT | deionized water that was at a temperature of 60–65° C., unless otherwise specified |
| HNO$_3$ | nitric acid, 70% concentrated |
| IO | iron oxyhydroxide (alpha-FeOOH), aqueous dispersion (pH = 5.0–5.5) about 90–95% of which is goethite, acicular particles with an average particle size of about 0.05 to 0.1 micrometer, a length to diameter or width ratio of about 1:1 to 3:1, and a surface area of about 100 m$^2$/g; dispersion yields 3% to 7% by weight Fe$_2$O$_3$ |

| | -continued |
|---|---|
| H-30 | alpha-alumina monohydrate (boehmite) (obtained from Alcoa Industrial Chemicals, Houston, TX, under the trade designation "HIQ-30") |
| CS1 | basic colloidal silica, 15% solids, (obtained from Eka Nobel, Inc. of Augusta, GA, under the trade designation "NYACOL 215"); average particle size 5 nm |
| CS2 | colloidal silica, 30% by weight solids (obtained from Nyacol Products, Inc. of Ashland, MA under the trade designation "NYACOL 830"); average particle size 8–10 nm |
| MGN | solution of magnesium nitrate (from Mallinckrodt Chemical, Paris, KY) in water containing, on a theoretical metal oxides basis, 10.5% MgO |
| ZRO | zirconia sol containing 20% solid by weight $ZrO_2$ (obtained from Nyacol Products, Inc. of Ashland, MA under the trade designation "ZR100/20"); average particle size 100 nm |
| ZRO2 | zirconia sol containing 20% solid by weight (obtained, from Nyacol Products, Inc. under the trade designation "ZR10/20"); average particle size 5–10 nm |
| ZRN | zirconyl acetate solution (on a theoretical metal oxides basis, ~22% $ZrO_2$; obtained from Magnesium Electron, Inc. of Flemington, NJ) |

Example 1

A dispersion was made by mixing together 600 grams of AAMH, 375 grams of ZRO, 46 grams of CS1, 36 grams of $HN_3$, 100 grams of IO having 6.5% iron oxide (calculated on a theoretical metal oxide basis as $Fe_2O_3$), and 1,650 grams of DWT in a conventional 4 liter, food grade blender (Waring blender available from Waring Products Division, Dynamics Corp. of America, New Hartford, Conn.; Model 34BL22(CB6)). The DWT, $HNO_3$, ZRO, CS1, and IO were placed in the blender and mixed. The AAMH was then added, and the contents mixed at low speed setting for 60 seconds.

The resulting dispersion was transferred into glass trays (obtained under the trade designation "PYREX") and allowed to gel at room temperature. The gelled dispersion was then dried overnight at approximately 93° C. (200° F.) to provide dried, friable solid, material. The dried material was crushed using pulverizer (having a 1.1 mm gap between the steel plates; obtained under the trade designation "BRAUN" Type UD from Braun Corp., Los Angeles, Calif.) to provide precursor abrasive grain (particles). The crushed material was screened to retain the particles that were between about 0.25 to 1 mm in size.

The retained particles were fed into a rotary calcining kiln to provide calcined abrasive grain precursor material. The calcining kiln consisted of a 15 cm inner diameter, 1.2 meter in length, stainless steel tube having a 0.3 meter hot zone. The tube was inclined at a 3.0 degree angle with respect to the horizontal. The tube rotated at about 3.5 rpm, to provide a residence time in the tube of about 4–5 minutes. The temperature of the hot zone was about 650° C.

The calcined abrasive grain precursor was fed into a rotary sintering kiln. The sintering kiln consisted of an 8.9 cm inner diameter, 1.32 meter long silicon carbide tube inclined at 4.4 degrees with respect to the horizontal and had a 31 cm hot zone. The heat was applied externally via SiC electric heating elements. The sintering kiln rotated at 5.0 rpm, to provide a residence time in the tube of about 7 minutes. The sintering temperature was about 1400° C. The product exited the kiln into room temperature air where it was collected in a metal container and allowed to cool to room temperature. The composition of the sintered abrasive grain, based on the formulation used to make the grain, was, on a theoretical metal oxide basis, 83% by weight $Al_2O_3$, 14% by weight $ZrO_2$, 1.5% by weight $SiO_2$, and 1.5% by weight $Fe_2O_3$, based on the total metal oxide content of the sintered abrasive grain.

A fracture surface of an Example 1 abrasive grain was examined using a scanning electron microscope (SEM). The average size of the alpha alumina crystallites was observed to be less than one micrometer. Further, an Example 1 abrasive grain was mounted and polished with a conventional polisher (obtained from Buehler of Lake Bluff, Ill. under the trade designation "ECOMET 3 TYPE POLISHER-GRINDER"). The sample was polished for about 3 minutes with a diamond wheel, followed by three minutes of polishing with each of 45, 30, 15, 9, 3, and 1 micrometer diamond slurries. The polished sample was examined using SEM in the backscattered mode. The average size of the zirconia crystallites was observed to be less than 0.25 micrometer. In addition, the SEM analysis indicated that the microstructure was dense and uniform.

The sintered alpha alumina-based ceramic abrasive grain was graded to retain the −35+40 mesh fraction (U.S.A. Standard Testing Sieves). This retained abrasive grain was incorporated into coated abrasive discs, which were tested for grinding performance. The coated abrasive discs were made according to conventional procedures. The abrasive grain were bonded to 17.8 cm diameter, 0.8 mm thick vulcanized fiber backings (having a 2.2 cm diameter center hole) using a conventional calcium carbonate-filled phenolic make resin (48% resole phenolic resin, 52% calcium carbonate, diluted to 81% solids with water) and a conventional cryolite-filled phenolic size resin (32% resole phenolic resin, 2% iron oxide, 66% cryolite, diluted to 78% solids with water). The wet make resin weight was about 185 $g/m^2$. Immediately after the make coat was applied, the abrasive grain were electrostatically coated. The make resin was precured for 90 minutes at 88° C. The wet size weight was about 850 $g/m^2$. The size resin was precured for 90 minutes at 88° C., followed by a final cure of 10 hours at 100° C. The fibre discs were flexed prior to testing.

Comparative Example A

Comparative Example A coated abrasive discs were prepared as described for Example 1 except the dispersion, which did not include ZRO, consisted of 600 grams of AAMH, 46 grams of CS1, 36 grams of $HNO_3$, 100 grams of IO having 6.5% iron oxide (calculated on a theoretical metal oxide basis as $Fe_2O_3$), and 1,450 grams of DWT, the sintering temperature was 1440°, and the sintering kiln rotated at 2 rpm, to provide a residence time in the tube of about 15 minutes. The composition of the sintered abrasive grain, based on the formulation used to make the grain, was, on a theoretical metal oxide basis, 97% by weight $Al_2O_3$, 1.5% by weight $SiO_2$, and 1.5% by weight $Fe_2O_3$, based on the total metal oxide content of the sintered abrasive grain.

Comparative Example B

Comparative Example B coated abrasive discs were prepared as described for Comparative Example A except (a) the dispersion did not include CS1, and (b) the crushed calcined precursor particles were impregnated with MGN (47 grams of MGN diluted to 60 ml with DWT for each 100 grams of calcined precursor), calcined a second time, and was sintered at 1350°, wherein the sintering kiln rotated at 2 rpm to provide a residence time in the tube of about 15 minutes. The composition of the sintered abrasive grain, based on the formulation used to make the grain, was, on a theoretical metal oxide basis, 94% by weight $Al_2O_3$, 4.5 by weight MgO, and 1.5% by weight $Fe_2O_3$, based on the total metal oxide content of the sintered abrasive grain.

Example 2

A solution was made by mixing together 625 grams of ZRO, 75 grams of CS1, 60 grams of $HNO_3$, 175 grams of IO having 6.5% iron oxide (calculated on a theoretical metal oxide basis as $Fe_2O_3$). 1000 grams of AAMH were fed into a 19 liter (5 gallon) pail rotating at 55 rpm and inclined 28° longitudinally continuously and simultaneously as a stream of the solution was sprayed onto the AAMH. Agglomerated balls about 3–5 mm in diameter were formed at about 60% solid. The agglomerated balls were fed into a catalyst extruder (available from Bonnot Co. of Uniontown, Ohio) and extruded through a die having thirty six 0.254 cm (0.1 inch) diameter openings. The pressure inside the extruder, measured directly next to the die, was about 410–477 $kg/cm^2$ (1200–1400 psi). The extruded material was placed on a conveyer belt which fed into a drying oven that was at about 93° C. (200° F.). The resulting dried, friable, solid material was crushed, screened, calcined, and sintered as described for Example 1. The composition of the sintered abrasive grain, based on the formulation used to make the abrasive grain, was, on a theoretical metal oxide basis, 83% by weight $Al_2O_3$, 14% by weight $ZrO_2$, 1.5 by weight $SiO_2$, and 1.5% by weight $Fe_2O_3$, based on the total metal oxide content of the sintered abrasive grain.

Example 2 abrasive grain were examined using the SEM as described in Example 1. The average size of the alpha alumina crystallites was observed to be less than 1 micrometer; the average size of the zirconia crystallites less than 0.25 micrometer. In addition, the SEM analysis indicated that the microstructure was dense and uniform.

The sintered alpha alumina-based ceramic abrasive grain was graded to retain the −30+35 and −35+40 mesh fractions (U.S.A. Standard Testing Sieves). These fractions were blended in a 1:1 ratio and incorporated into coated abrasive discs, which were tested for grinding performance. The coated abrasive discs were made as described in Example 1.

Comparative Example C

Comparative Example C was prepared as described for Example 2 except the dispersion, which did not include ZRO, consisted of 1,000 grams of AAMH, 75 grams of CS1, 60 grams of $HNO_3$, 175 grams of IO having 6.5% iron oxide (calculated on a theoretical metal oxide basis as $Fe_2O_3$), and 400 grams of DWT; and it was sintered as described for Comparative Example A. The composition of the sintered abrasive grain, based on the formulation used to make the grain, was, on a theoretical metal oxide basis, 97% by weight $Al_2O_3$, 1.5 by weight $SiO_2$, and 1.5% by weight $Fe_2O_3$, based on the total metal oxide content of the sintered abrasive grain.

Example 3

Example 3 was prepared as described for Example 1 except the dispersion consisted of 600 grams of AAMH, 95 grams of ZRO2, 46 grams of CS 1, 36 grams of $HNO_3$, 100 grams of IO having 6.5% iron oxide (calculated on a theoretical metal oxide basis as $Fe_2O_3$), and 1,650 grams of DWT; and the sintering kiln rotated at 2 rpm. The composition of the sintered abrasive grain, based on the formulation used to make the grain, was, on a theoretical metal oxide basis, 93% by weight $Al_2O_3$, 4% by weight $ZrO_2$, 1.5 by weight $SiO_2$, and 1.5% by weight $Fe_2O_3$, based on the total metal oxide content of the sintered abrasive grain.

Example 3 abrasive grain were examined using the SEM as described in Example 1. The average size of the alpha alumina crystallites was observed to be less than 1 micrometer; the average size of the zirconia crystallites less than 0.25 micrometer. In addition, the SEM analysis indicated that the microstructure was dense and uniform.

Example 4

Example 4 was prepared as described for Example I except the dispersion consisted of 600 grams of AAMH, 185 grams of ZRO2, 46 grams of CS1, 36 grams of $HNO_3$, 100 grams of IO having 6.5% iron oxide (calculated on a theoretical metal oxide basis as $Fe_2O_3$), and 1,650 grams of DWT; and the sintering kiln rotated at 2 rpm. The composition of the sintered abrasive grain, based on the formulation used to make the grain, was, on a theoretical metal oxide basis, 89.5% by weight $Al_2O_3$, 7.5% by weight $ZrO_2$, 1.5 by weight $SiO_2$, and 1.5% by weight $Fe_2O_3$, based on the total metal oxide content of the sintered abrasive grain.

Example 4 abrasive grain were examined using the SEM as described in Example 1. The average size of the alpha alumina crystallites was observed to be less than 1 micrometer; the average size of the zirconia crystallites less than 0.25 micrometer. In addition, the SEM analysis indicated that the microstructure was dense and uniform.

Grinding Performance Evaluation of Examples 1–4 and Comparative Examples A-C

The grinding performance of Example 1 and Comparative Example A and B coated abrasive discs were evaluated according to the following test procedure. Each coated abrasive disc was mounted on a beveled aluminum back-up pad, and used to grind the face of a pre-weighed 1.25 cm×18 cm×10 cm 1018 mild steel workpiece. The disc was driven at 5,000 rpm while the portion of the disc overlaying the beveled edge of the back-up pad contacted the workpiece at a load of 10.88 kg (24 lbs.). Each disc was used to grind individual workpiece in sequence for one-minute intervals. The total cut was the sum of the amount of material removed from the workpieces throughout the test period. Two discs were tested for each example. The results, which are averages of the discs tested, are summarized in Table 1, below.

TABLE 1

| Example | Total Cut, g | Metal Removed For The 12th minute, g |
|---|---|---|
| Comparative Example A* | 1524 | 67 |
| Comparative Example B | 1622 | 88 |
| 1 | 2066 | 113 |

*testing of Comparative Example A was discontinued after 10 minutes due to the relatively low cut rate; the cut for the 10th minute was 67 grams The grinding performance of Example 2 and Comparative Example C coated abrasive discs were evaluated as described for Example 1 (above). Two discs were tested for each example. The results, which are averages of the discs tested, are summarized in Table 2, below.

TABLE 2

| Example | Total Cut, g |
|---|---|
| Comparative Example C | 1047 |
| Example 2 | 1324 |

The grinding performance of Example 3 and 4, and Comparative Example C, coated abrasive discs were evaluated as described for Example 1 (above), except the load during grinding was 7.73 Kg (17 lbs.). Two discs were tested for each example. The results, which are averages of the discs tested, are summarized in Table 3, below.

TABLE 3

| Example | Total Cut, g |
|---|---|
| Comparative Example A | 1669 |
| 3 | 1721 |
| 4 | 2030 |

Example 5

Example 5 sintered abrasive was prepared as described for Example 2 except the solution consisted of 2,650 grams of ZRN, 750 grams of CS2, 1,250 grams of $HNO_3$, 5,000 grams of IO having 4.7% iron oxide (calculated on a theoretical metal oxide basis as $Fe_2O_3$), and 2,400 grams of DWT, and 18,000 grams of H-30 were used in place of the AAMH; and the sintering kiln rotated at 2 rpm. The composition of the sintered abrasive grain, based on the formulation used to make the grain, was, on a theoretical metal oxide basis, 93% $Al_2O_3$, 4% $ZrO_2$, 1.5 $SiO_2$, and 1.5% $Fe_2O_3$, based on the total metal oxide content of the sintered abrasive grain.

Example 5 abrasive grain were examined using the SEM as described in Example 1. The average size of the alpha alumina crystallites was observed to be less than 1 micrometer; the average size of the zirconia crystallites less than 0.25 micrometer. In addition, the SEM analysis indicated that the microstructure was dense and uniform.

The alpha alumina ceramic abrasive grain, which was graded into a 1:1 mix of −30+35 and −35+40 mesh fractions (U.S.A. Standard Testing Sieves), was incorporated into 439 cm×335 cm (173"×132") resin-treated YF weight cloth belts. The make and size resins, which were the same as those for Example 1, were precured and cured as described in Example 1. The wet make and size weights were about 185 g/m² and about 850 g/m², respectively. The cured belt material was then converted into 2.5 cm×100 cm (1"×40") belts. The coated abrasive belts were flexed prior to testing.

Example 6

Example 6 was prepared as described for Example 5 except the dispersion consisted of 18,000 grams of H-30, 4,750 grams of ZRN, 750 grams of CS2, 1,250 grams of $HNO_3$, 5,000 grams of IO having 4.7% iron oxide (calculated on a theoretical metal oxide basis as $Fe_2O_3$), and 1,250 grams of DWT. The composition of the sintered abrasive grain, based on the formulation used to make the grain, was, on a theoretical metal oxide basis, 90% by weight $Al_2O_3$, 7% by weight $ZrO_2$, 1.5% by weight $SiO_2$, and 1.5% by weight $Fe_2O_3$, based on the total metal oxide content of the abrasive grain.

Figure 7:
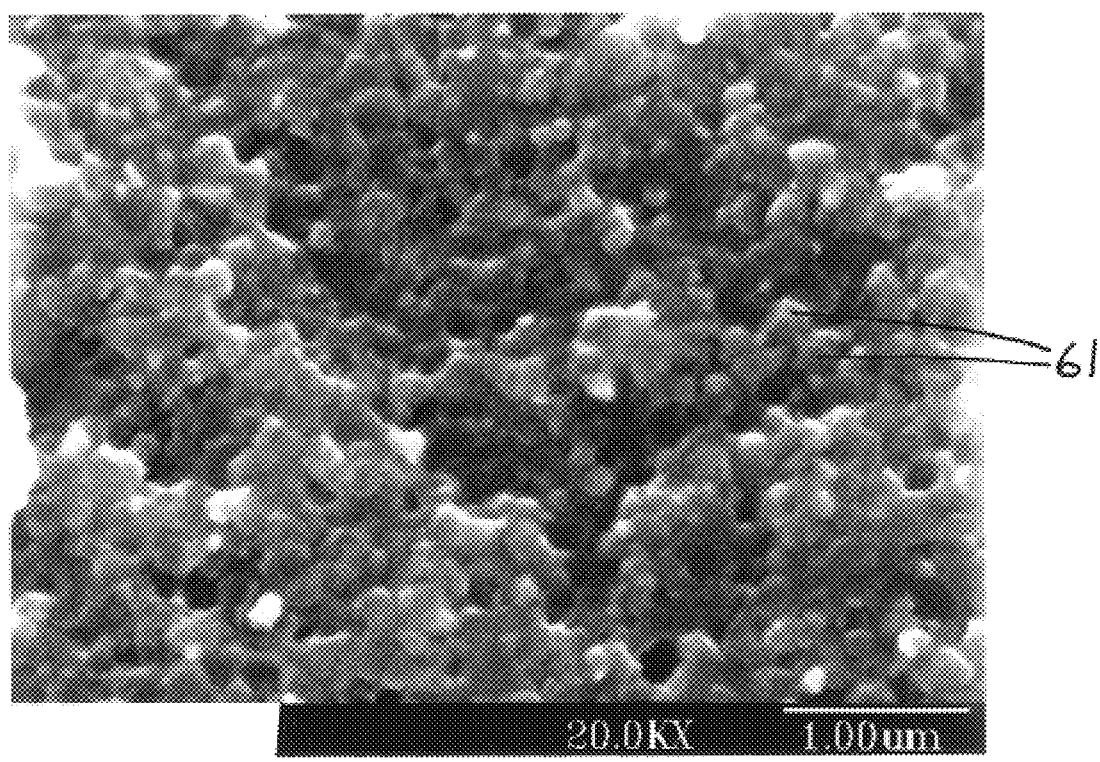
FIG. 7 is a scanning electron photomicrograph of a fracture surface of an abrasive grain according to the present invention.
Figure 8:
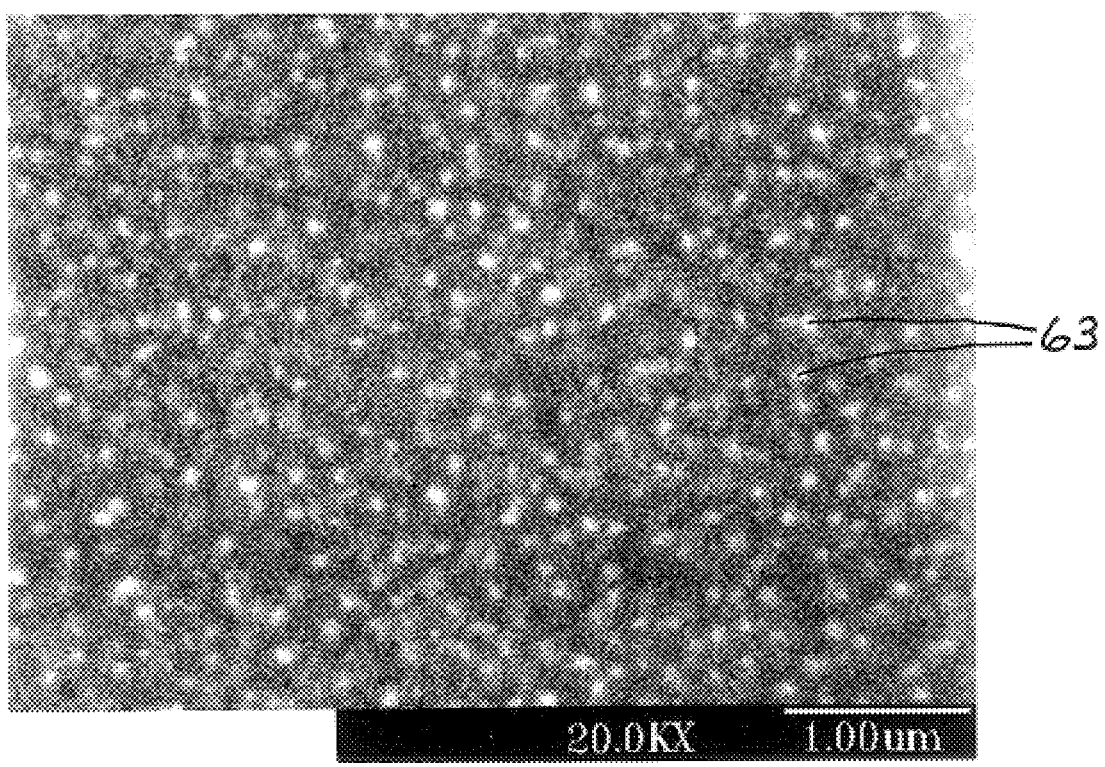
FIG. 8 is a back scattered electron photomicrograph of abrasive grain according to the present invention.

Example 6 abrasive grain were examined using the SEM as described in Example 1. FIG. 7 is a photomicrograph of a fracture surface of the Example 6 abrasive grain showing the alpha alumina crystallites 61. FIG. 8 is a photomicrograph a polished section of Example 6 abrasive grain in the back scattered mode showing zirconia crystallites 63. The average size of the alpha alumina crystallites was observed to be less than 1 micrometer; the average size of the zirconia crystallites less than 0.25 micrometer. In addition, the SEM analysis indicated that the microstructure was dense and uniform.

Example 7

Example 7 was prepared as described for Example 5 except the dispersion consisted of 18,000 grams of H-30, 7,000 grams of ZRN, 750 grams of CS2, 1,250 grams of $HNO_3$, 5,000 grams of IO having 4.7% iron oxide (calculated on a theoretical metal oxide basis as $Fe_2O_3$). The composition of the sintered abrasive grain, based on the formulation used to make the grain, was on a theoretical oxide basis, 87% by weight $Al_2O_3$, 10% by weight $ZrO_2$, 1.5% by weight $SiO_2$, and 1.5% by weight $Fe_2O_3$, based on the total metal oxide content of the abrasive grain.

Example 7 abrasive grain were examined using the SEM as described in Example 1. The average size of the alpha alumina crystallites was observed to be less than 1 micrometer; the average size of the zirconia crystallites less than 0.25 micrometer. In addition, the SEM analysis indicated that the microstructure was dense and uniform.

Comparative Example D

The Comparative Example D belt was prepared as described for Example 5, except the abrasive used was a sol-gel-derived alpha alumina ceramic abrasive grain available from the 3M Company under the trade designation "201 CUBITRON". This type of abrasive grain is designed to be used in high pressure grinding applications.

Grinding Performance Evaluation of Examples 5–7 and Comparative Example D

The grinding performance of Example 5–7 and Comparative Example D coated abrasive belts were evaluated according to the following test procedure. The 2.5cm×100 cm (1"×40") belts were placed around a metal wheel of a belt grinder (obtained under the trade designation "SPA2030ND" from Elb Grinders Corporation of Mountainside, N.J.). The metal wheel was rotating at a speed of 1,700 smm (surface meters per minute). The 1018 mild steel workpieces (1.3 cm×10.2 cm×35.6 cm (0.5"×4"×14") dimension) were mounted on a bed oscillating at a speed of 6 mpm (meters per minute). The belt was tested at a predetermined infeed rate for each pass. The workpieces were water cooled after each pass. The normal grinding forces were monitored. When the normal grinding force reached 23 kgf, the grinding test was ended. The amount of metal removed for each belt was determined. Two belts were tested for each example, except that four belts were tested for Example 6. The results, which are averages of the belts tested, are summarized in Table 4, below.

TABLE 4

| Example | Metal Removed at 152.4 micrometer (6 mils) infeed rate, g | Metal Removed at 177.8 micrometer (7 mils) infeed rate, g |
|---|---|---|
| Comparative D | 1022 | 1113 |
| 5 | 2433 | 1427 |
| 6 | 2633 | 1723 |
| 7 | 2336 | 1532 |

For the particular test, the 152.4 micrometer (6 mils) infeed represents a relatively low grinding pressure application, and the 177.8 micrometer (7 mils) infeed a relatively high grinding pressure application.

Examples 8 and 9 and Comparative Example E

Examples 8 and 9 abrasive grain were prepared as described for Examples 5 and 6, except the sintered alpha alumina-based abrasive grain used to make the coated abrasive belts were graded into a 1:1 mixture of −25+30 mesh and −30+35 mesh sizes.

The composition of the sintered abrasive grains, based on the formulation used to make the grain, was, on a theoretical metal oxide bases, for Example 8, 93% by weight $Al_2O_3$, 4% by weight $ZrO_2$, 1.5% by weight $SiO_2$, and 1.5% $Fe_2O_3$, and, for Example 9, 90% by weight $Al_2O_3$, 7% by weight $ZrO_2$, 1.5% by weight $SiO_2$, and 1.5% by weight $Fe_2O_3$, based on the total metal oxide content of the abrasive grain.

Examples 8 and 9, and Comparative Example E, belts were prepared as described for Example 5, wherein the abrasive grain used for Comparative Example E was the same as that used for Comparative Example D. These belts were tested as described for Examples 5–7 and Comparative Example D except the infeed rates used were 127 micrometers (5 mils), 152.4 micrometer (6 mils), and 177.8 micrometer (7 mils). The results, which on one belt for each in-feed rate (i.e., three belts were tested for each lot) are summarized in Table 5 below, except the results for Comparative Example E at an in-feed rate of 127 micrometers (5 mils) is an average of two belts.

TABLE 5

| Example | Metal Removed at 127 micrometers (5 mils) infeed rate, g | Metal Removed at 152.4 micrometer (6 mils) infeed rate, g | Metal Removed at 177.8 micrometer (7 mils) infeed rate, g |
| --- | --- | --- | --- |
| 8 | 6667 | 6408 | 1577 |
| 9 | 8671 | 6338 | 4493 |
| Comparative D | 3784 | 1798 | 907 |

Example 10 and Comparative Example F

Example 10 was prepared as described for Example 1 except the amount of ZRO was reduced by 46.4%, and the amount of AAMH was increased by 7.8%. The composition of the sintered abrasive grain was 89.5% by weight $Al_2O_3$, 7.5% by weight $ZrO_2$, 1.5% by weight $SiO_2$, and 1.5% by weight $Fe_2O_3$, based on the metal oxide content of the abrasive grain.

Comparative Example F was prepared as described for Example 1 except no CS1 was used, the amount of ZRO was reduced by 46.4%, and the amount of AAMH was increased by 9.6%. The composition of the sintered abrasive grain was 91% by weight $Al_2O_3$, 7.5% by weight $ZrO_2$, and 1.5% by weight $Fe_2O_3$, based on the metal oxide content of the abrasive grain.

Example 10 and Comparative Example F were tested as described for Example 1 except the abrasive grain used to make the coated abrasive discs were graded into a 1:1 mixture of −25+30 mesh and −30+35 mesh sizes, the load during the test was 7.73 kilograms (17 lbs.), and three discs for each example were tested. The average total cut for Example 10 and Comparative Example F were 1353 grams and 1230 grams, respectively.

Example 12

Example 12 abrasive grain was prepared as described for Example 1 except the silica sol was CS2, the calcined grain was impregnated with MGN. Each 100 grams of calcined precursor was mixed with 30 grams of MGN which was prior to the impregnation was diluted to 60 ml. The impregnated grain was dried and re-calcined, the sintering kiln rotated at about 2 rpm to provide a residence time in the tube of about 15 minutes, and the sintering temperature was about 1375° C. The composition of the sintered abrasive grain, based on the formulation used to make the grain, was, on a theoretical metal oxide basis, 93.5% by weight $Al_2O_3$, 1% by weight $ZrO_2$, 3% by weight MgO, 1% by weight $SiO_2$, and 1.5% by weight $Fe_2O_3$, based on the total metal oxide content of the sintered abrasive grain.

The sintered alpha alumina-based ceramic abrasive grain was incorporated into coated abrasive discs as described for Example 1, except the abrasive grain was graded to a 1:1 mix of −35+40 and −40+45 mesh fractions (U.S.A. Standard Testing Sieves).

Comparative Example G

Comparative Example G coated abrasive discs were prepared as described for Example 12 except (a) there was no ZRN or CS2 were used, (b) the amount of MGN was increased by 50%, (c) the amount of AAMH was decreased by 0.5%, and (d) the abrasive grain was sintered at 1350° C. The composition of the sintered abrasive grain, based on the formulation used to make the grain, was, on a theoretical metal oxide basis, 94% by weight $Al_2O_3$, 4.5% by weight MgO, and 1.5% by eight $Fe_2O_3$, based on the total metal oxide content of the sintered abrasive grain.

Example 13

Example 13 coated abrasive discs were prepared as described for Example 12 except (a) the amount of ZRN was increased by 600%, and (b) the amount of AAMH was decreased by 6.4%. The composition of the sintered abrasive grain, based on the formulation used to make the grain, was, on a theoretical metal oxide basis, 87.5% by weight $Al_2O_3$, by weight 7% by weight $ZrO_2$, 3% by weight MgO, 1% by weight $SiO_2$, and 1.5% by weight $Fe_2O_3$, based on the total metal oxide content of the sintered abrasive grain.

Example 14

Example 14 coated abrasive discs were prepared as described for Example 12 except (a) the amount of MGN was increased by 133%, and (b) the amount of AAMH was decreased by 5.3%. The composition of the sintered abrasive grain, based on the formulation used to make the grain, was, on a theoretical metal oxide basis, 88.5% by weight $Al_2O_3$, 1% by weight $ZrO_2$, 7% by weight MgO, 1% by weight $SiO_2$, and 1.5% by weight $Fe_2O_3$, based on the total metal oxide content of the sintered abrasive grain.

Example 15

Example 15 coated abrasive discs were prepared as described for Example 12 except (a) the amount of ZRN was increased by 600%, (b) the amount of MGN was increased by 133%, and (c) the amount of AAMH was decreased by 10.7%. The composition of the sintered abrasive grain, based on the formulation used to make the grain, was, on a theoretical metal oxide basis, 83.5% by weight $Al_2O_3$, 7% by weight $ZrO_2$, 7% by weight MgO, 1% by weight $SiO_2$, and 1.5% by weight $Fe_2O_3$, based on the total metal oxide content of the sintered abrasive grain.

Example 16

Example 16 coated abrasive discs were prepared as described for Example 12 except (a) the amount of CS2 was increased by 200% and (b) the amount of AAMH was decreased by 2.1%. The composition of the sintered abrasive grain, based on the formulation used to make the grain, was, on a theoretical metal oxide basis, 91.5% by weight $Al_2O_3$, 1% by weight $ZrO_2$, 3% by weight MgO, 3% by weight $SiO_2$, and 1.5% by weight $Fe_2O_3$, based on the total metal oxide content of the sintered abrasive grain.

Example 17

Example 17 coated abrasive discs were prepared as described for Example 12 except (a) the amount of ZRN was increased by 600%, (b) the amount of CS2 was increased by 200%, and (c) the amount of AAMH was decreased by 8.6%. The composition of the sintered abrasive grain, based on the formulation used to make the grain, was, on a theoretical metal oxide basis, 85.5% by weight $Al_2O_3$, 7% by weight $ZrO_2$, 3% by weight MgO, 3% by weight $SiO_2$, and 1.5% by weight $Fe_2O_3$, based on the total metal oxide content of the sintered abrasive grain.

Example 18

Example 18 coated abrasive discs were prepared as described for Example 12 except (a) the amount of CS2 was increased by 200%, (b) the amount of MGN was increased by 133%, and (c) the amount of AAMH was decreased by 6.4%. The composition of the sintered abrasive grain, based on the formulation used to make the grain, was, on a theoretical metal oxide basis, 87.5% by weight $Al_2O_3$, 1% by weight $ZrO_2$, 7% by weight MgO, 3% by weight $SiO_2$, and 1.5% by weight $Fe_2O_3$, based on the total metal oxide content of the sintered abrasive grain.

Example 19

Example 19 coated abrasive discs were prepared as described for Example 12 except (a) the amount of ZRN was increased by 600%, (b) the amount of MGN was increased by 133%, (c) the amount of CS2 was increased by 200%, and (d) the amount of AAMH was decreased by 12.8%. The composition of the sintered abrasive grain, based on the formulation used to make the grain, was, on a theoretical metal oxide basis, 81.5% weight $Al_2O_3$, 7% by weight $ZrO_2$, 7% by weight MgO, 3% by weight $SiO_2$, and 1.5% by weight $Fe_2O_3$, based on the total metal oxide content of the sintered abrasive grain.

Grinding Performance Evaluation of Examples 12–19 and Comparative Examples G

The grinding performance of Examples 12–19 and Comparative Example G coated abrasive discs were evaluated as described for Examples 1–4 and Comparative Example A, except the workpieces were 4150 steel workpieces, and the load was 7.7 kilograms. average total cut for each example is reported below in Table 6.

TABLE 6

| Example | Total Cut, grams | % of Comp. G, % |
|---|---|---|
| 12 | 792 | 110 |
| 13 | 725 | 101 |
| 14 | 790 | 110 |
| 15 | 830 | 115 |
| 16 | 711 | 99 |
| 17 | 700 | 97 |
| 18 | 728 | 101 |
| 19 | 702 | 98 |
| Comp. G | 721 | 100 |

The grinding performance of Examples 12–19 and Comparative Example G coated abrasive discs were also evaluated using the same grinding test described for the results reported in Table 6, except the load was 5.9 kilograms. Two discs were tested for each example each. The average total cut for each example is reported below in Table 7.

TABLE 7

| Example | Total Cut, grams | % of Comp. G, % |
|---|---|---|
| 12 | 713 | 120 |
| 13 | 631 | 106 |
| 14 | 660 | 116 |
| 15 | 709 | 119 |
| 16 | 664 | 111 |
| 17 | 673 | 113 |
| 18 | 351 | 59 |
| 19 | 663 | 111 |
| Comp. G | 596 | 100 |

The grinding performance of Examples 12, 15, and 16 and Comparative Example G coated abrasive discs were also evaluated using the same grinding test described for the results reported in Table 7, except the fifteen one minute intervals were used instead of ten one-minute intervals. Two discs were tested for each example. The average total cut for each example is reported below in Table 8.

TABLE 8

| Example | Total Cut, grams | % of Comp. G, % |
|---|---|---|
| Comp. G | 794 | 100 |
| 12 | 907 | 114 |
| 15 | 931 | 117 |
| 16 | 983 | 124 |

The grinding performance of Examples 12, 14, and 15 and Comparative Example G caoted abrasive discs were also evaluated using the same grinding test described for the results reported in Table 6, except the workpieces were 1018 mild steel. Two discs were tested for each example. The average total cut for each example is reported below in Table 9.

TABLE 9

| Example | Total Cut, grams | % of Comp. G |
|---|---|---|
| Comp. G | 796 | 100 |
| 12 | 1076 | 135 |
| 14 | 1251 | 157 |
| 15 | 1066 | 134 |

Various modifications and alterations of this invention will become apparent to those skilled in the art without departing from the scope and spirit of this invention, and it should be understood that this invention is not to be unduly limited to the illustrative ebodiments set forth herein.

What is claimed is:

1. Sintered alpha alumina-based abrasive grain comprising at least 0.1 percent by weight $SiO_2$ and in the range from 1 to 14 percent by weight $ZrO_2$, based on the total metal oxide content of said abrasive grain, wheren the alpha alumina of said abrasive grain has an average crystallite size of less than 1 micrometer, wherein said $ZrO_2$ includes crystalline zirconia, and wherein $ZrO_2$ present as crystalline zirconia has an average crystallite size of less than 0.25 micrometer.

2. The sintered alpha alumina-based abrasive grain according to claim 1 having a density that is at least 95 percent of the theoretical density.

3. The sintered alpha alumina-based abrasive grain according to claim 1, wherein said $Al_2O_3$ is present in the range from 55 to 98 percent by weight, said $SiO_2$ is present in the range from 1 to 3 percent by weight, and said $ZrO_2$ is present in the range from 1 to 14 percent by weight, based on the total metal oxide content of said abrasive grain.

4. The sintered alpha alumina-based abrasive grain according to claim 3, wherein at least a majority of said alpha alumina was nucleated with a nucleating agent.

5. The sintered alpha alumina-based abrasive grain according to claim 4, wherein said nucleating agent is $\alpha$-$Fe_2O_3$, and is present, on a theoretical metal oxide basis, in the range from 0.1 to 10 percent by weight, based on the total metal oxide content of said abrasive grain.

6. The sintered alpha alumina-based abrasive grain according to claim 1, wherein said $Al_2O_3$ is present in the range from 70 to 93 percent by weight, said $SiO_2$ is present in the range from 1 to 3 percent by weight, and said $ZrO_2$ is present in the range from 1 to 14 percent by weight, based on the total metal oxide content of said abrasive grain.

7. The sintered alpha alumina-based abrasive grain according to claim 1, wherein said $Al_2O_3$ is present in the range from 80 to 93 percent by weight, said $SiO_2$ is present in the range from 1 to 3 percent by weight, and said $ZrO_2$ is present in the range from 5 to 10 percent by weight, based on the total metal oxide content of said abrasive grain.

8. The sintered alpha alumina-based abrasive grain according to claim 7, wherein at least a majority of said alpha alumina was nucleated with $\alpha$-$Fe_2O_3$ nucleating agent, and wherein said $\alpha$-$Fe_2O_3$ nucleating agent is present, on a theoretical metal oxide basis, in the range from 1 to 3 percent by weight, based on the metal total oxide content of said abrasive grain.

9. The sintered alpha alumina-based abrasive grain according to claim 1, wherein the alpha alumina of said abrasive grain has an average crystallite size of less than 0.8 micrometer.

10. The sintered alpha alumina-based abrasive grain according to claim 9, having a density that is at least 95 percent of the theoretical density.

11. The sintered alpha alumina-based abrasive grain according to claim 1, wherein the alpha alumina of said abrasive grain has an average crystallite size of less than 0.6 micrometer.

12. The sintered alpha alumina-based abrasive grain according to claim 1, wherein the alpha alumina of said abrasive grain has an average crystallite size of less than 0.5 micrometer.

13. The sintered alpha alumina-based abrasive grain according to claim 12, having a density that is at least 95 percent of the theoretical density.

14. The sintered alpha alumina-based abrasive grain according to claim 1, wherein the alpha alumina of said abrasive grain has an average crystallite size of less than 0.3 micrometer.

15. The sintered alpha alumina-based abrasive grain according to claim 1, wherein at least a majority of said alpha alumina was nucleated with a nucleating agent.

16. The sintered alpha alumina-based abrasive grain according to claim 15, wherein said nucleating agent is $\alpha$-$Fe_2O_3$.

17. The sintered alpha alumina-based abrasive grain according to claim 1, further comprising metal oxide selected from the group consisting of: lithium oxide, manganese oxide, chromium oxide, praseodymium oxide, dysprosium oxide, samarium oxide, cobalt oxide, zinc oxide, neodymium oxide, yttrium oxide, ytterbium oxide, magnesium oxide, nickel oxide, sodium oxide, titanium oxide, lanthanum oxide, gadolinium oxide, dysprosium oxide, europium oxide, ferric oxide, hafnium oxide, erbium oxide, and combinations thereof.

18. The sintered alpha alumina-based abrasive grain according to claim 1, which comprises in the range from 1 to 3 percent by weight of said $SiO_2$, based on the total metal oxide content of said abrasive grain.

19. The sintered alpha alumina-based abrasive grain according to claim 1, which comprises in the range from 4 to 14 percent by weight of said $ZrO_2$, based on the total metal oxide content of said abrasive grain.

20. The sintered alpha alumina-based abrasive grain according to claim 1, which comprises in the range from 1 to 3 percent by weight of said $SiO_2$ and in the range from 4 to 14 percent by weight of said $ZrO_2$, based on the total metal oxide ontent of said abrasive grain.

21. An abrasive article including:
   a binder; and
   a plurality of abrasive grain according to claim 1 secured within said article by said binder.

22. The abrasive article according to claim 21 wherein said abrasive article is a grinding wheel.

23. A coated abrasive article comprising:
   a backing having a major surface; and
   an abrasive layer comprising said plurality of abrasive grain according to claim 1 secured to said major surface of said backing by a binder.

24. A method for making alpha alumina-based ceramic abrasive grain, said method comprising:
   preparing a dispersion by combining components comprising liquid medium, peptizing agent, zirconia source, silica source, and alumina source;
   converting said dispersion to particulate alpha alumina-based ceramic abrasive grain precursor material; and
   sintering said precursor material to provide sintered alpha alumina-based abrasive grain comprising at least 0.1 percent by weight $SiO_2$ and in the range from 1 to 14 percent by weight $ZrO_2$, based on the total metal oxide content of said abrasive grain, wherein the alpha alumina of said abrasive grain has an average crystallite size of less than 1 micrometer, wherein said $ZrO_2$ includes crystalline zirconia, and wherein $ZrO_2$ present as crystalline zirconia has an average crystallite size of less than 0.25 micrometer.

25. The method according to claim 24, wherein said alumina source is boehmite.

26. The method according to claim 25, wherein between said converting and said sintering, said method further comprises (i) impregnating said precursor material with a mixture prepared by combining components comprising a second liquid medium and at least one of metal oxide or metal oxide precursor to provide impregnated precursor material; (ii) drying said impregnated precursor material; and (iii) calcining the dried, impregnated precursor material.

27. The method according to claim 25, wherein said sintering conducted below 1400° C.

28. The method according to claim 27, wherein said sintered alpha alumina-based abrasive grain has a density that is at least 95 percent of the theoretical density.

29. The method according to claim 27, wherein said zirconia source includes zirconium salt.

30. The method according to claim 27, wherein said zirconia source includes zirconia sol.

31. The method according to claim 25, wherein said silica source includes silica sol.

32. The method according to claim 25, wherein said components for preparing said dispersion further comprise nucleating material, and wherein at least a majority of the alpha alumina of said abrasive grain was nucleated with a nucleating agent.

33. The method according to claim 25, wherein sintered alpha alumina-based abrasive grain comprises in the range from 1 to 3 percent by weight of said $SiO_2$, based on the total metal oxide content of said abrasive grain.

34. The method according to claim 25, wherein sintered alpha alumina-based abrasive grain comprises in the range from 4 to 14 percent by weight of said $ZrO_2$, based on the total metal oxide content of said abrasive grain.

35. The method according to claim 27, wherein sintered alpha alumina-based abrasive grain comprises in the range from 1 to 3 percent by weight of said $SiO_2$ and in the range from 4 to 14 percent by weight of said $ZrO_2$, based on the total metal oxide content of said abrasive grain.

36. A method for making an abrasive article, said method comprising:
preparing a dispersion by combining components comprising liquid medium, peptizing agent, zirconia source, silica source, and alumina source;
converting said dispersion to particulate alpha alumina-based ceramic abrasive grain precursor material;
sintering said precursor material to provide sintered alpha alumina-based abrasive grain comprising at least 0.1 percent by weight $SiO_2$ and in the range from 1 to 14 percent by weight $ZrO_2$, based on the total metal oxide content of said abrasive grain, wherein the alpha alumina of said abrasive grain has an average crystallite size of less than 1 micrometer, wherein said $ZrO_2$ includes crystalline zirconia, and wherein $ZrO_2$ present as crystalline zirconia has an average crystallite size of less than 0.25 micrometer; and
combining at least a plurality of said alpha alumina-based ceramic abrasive grain with binder to provide an abrasive article.

37. The method according to claim 36, wherein said alumina source is boehmite.

38. The method according to claim 37, wherein said abrasive article is a coated abrasive article that includes a backing.

39. The method according to claim 37, wherein combining at least a plurality of said alpha alumina-based ceramic abrasive grain with binder includes combining fused alumina abrasive grain with said binder.

40. The method according to claim 37, wherein sintered alpha alumina-based abrasive grain comprises in the range from 1 to 3 percent by weight of said $SiO_2$ and in the range from 4 to 14 percent by weight of said $ZrO_2$, based on the total metal oxide content of said abrasive grain.

41. A method for making alpha a lumina-based ceramic abrasive grain, said method comprising:
preparing a dispersion by combining components comprising first liquid medium, peptizing agent, silica source, and alumina source;
converting said dispersion to particulate alpha alumina-based ceramic abrasive grain precursor material;
impregnating said precursor material with a composition comprising a mixture comprising a second liquid medium and a zirconia source; and
sintering the impregnated precursor material to provide sintered alpha alumina-based abrasive grain comprising at least 0.1 percent by weight $SiO_2$ and in the range from 1 to 14 percent by weight $ZrO_2$, based on the total metal oxide content of said abrasive grain, wherein the alpha alumina of said abrasive grain has an average crystallite size of less than 1 micrometer, wherein said $ZrO_2$ includes crystalline zirconia, and wherein $ZrO_2$ present as crystalline zirconia has an average crystallite size of less than 0.25 micrometer.

42. The method according to claim 41, wherein said alumina source is boehmite.

43. The method according to claim 42, wherein the components combined for said dispersion further comprise a zirconia source.

44. The method according to claim 43, wherein said zirconia source includes zirconia sol.

45. The method according to claim 42, wherein said sintering conducted below 1400° C.

46. The method according to claim 45 wherein said sintered alpha alumina-based abrasive grain has a density that is at least 95 percent of the theoretical density.

47. The method according to claim 42, wherein said zirconia source includes zirconium salt.

48. The method according to claim 42, wherein said silica source includes silica sol.

49. The method according to claim 42, wherein said components for preparing said dispersion further comprise nucleating material, and wherein at least a majority of the alpha alumina of said abrasive grain was nucleated with a nucleating agent.

50. The method according to claim 42, wherein sintered alpha alumina-based abrasive grain comprises in the range from 1 to 3 percent by weight of said $SiO_2$, based on the total metal oxide content of said abrasive grain.

51. The method according to claim 42, wherein sintered alpha alumina-based abrasive grain comprises in the range from 4 to 14 percent by weight of said $ZrO_2$, based on the total metal oxide content of said abrasive grain.

52. The method according to claim 42, wherein sintered alpha alumina-based abrasive grain comprises in the range from 1 to 3 percent by weight of said $SiO_2$ and in the range from 4 to 14 percent by weight of said $ZrO_2$, based on the total metal oxide content of said abrasive grain.

53. A method for making an abrasive article, said method comprising:
preparing a dispersion by combining components comprising first liquid medium, peptizing agent, silica source, and alumina source;
converting said dispersion to particulate alpha alumina-based ceramic abrasive grain precursor material;
impregnating said precursor material with a composition comprising a mixture comprising a second liquid medium and a zirconia source;
sintering the impregnated precursor material to provide sintered alpha alumina-based abrasive grain comprising at least 0.1 percent by weight $SiO_2$ and in the range from 1 to 14 percent by weight $ZrO_2$, based on the total metal oxide content of said abrasive grain, wherein the alpha alumina of said abrasive grain has an average crystallite size of less than 1 micrometer, wherein said $ZrO_2$ includes crystalline zirconia, and wherein $ZrO_2$ present as crystalline zirconia has an average crystallite size of less than 0.25 micrometer; and
combining at least a plurality of said alpha alumina-based ceramic abrasive grain with binder to provide an abrasive article.

54. The method according to claim 53, wherein said alumina source is boehmite.

55. The method according to claim 54, wherein said abrasive article is a coated abrasive article that includes a backing.

56. The method according to claim 55, wherein combining at least a plurality of said alpha alumina-based ceramic abrasive grain with binder includes combining fused alumina abrasive grain with said binder.

57. The method according to claim 54, wherein said components for preparing said dispersion further comprise nucleating material, and wherein at least a majority of the alpha alumina of said abrasive grain was nucleated with a nucleating agent.

58. The method according to claim 54, wherein sintered alpha alumina-based abrasive grain comprises in the range from 1 to 3 percent by weight of said $SiO_2$ and in the range from 4 to 14 percent by weight of said $ZrO_2$, based on the total metal oxide content of said abrasive grain.

59. A method of abrading a surface comprising:

contacting a plurality of abrasive grain with a surface of a substrate at a contact pressure of at least 1 $kg/cm^2$, wherein at least a portion of said abrasive grain is sintered alpha alumina-based abrasive grain comprising at least 0.1 percent by weight $SiO_2$ and in the range from 1 to 14 percent by weight $ZrO_2$, based on the total metal oxide content of said abrasive grain, wherein the alpha alumina of said abrasive grain has an average crystallite size of less than 1 micrometer, wherein said $ZrO_2$ includes crystalline zirconia, and wherein $ZrO_2$ present as crystalline zirconia has an average crystallite size of less than 0.25 micrometer; and moving at least of one said plurality of abrasive grain or said surface relative to the other to abrade at least a portion of said surface with said abrasive grain.

60. The method according to claim 59 wherein at least 75 percent by weight of the abrasive grain is said sintered alpha alumina-based abrasive grain.

61. The method according to claim 59 wherein sintered alpha alumina-based abrasive grain comprises in the range from 1 to 3 percent by weight of said $SiO_2$, based on the total metal oxide content of said abrasive grain.

62. The method according to claim 59 wherein sintered alpha alumina-based abrasive grain comprises in the range from 4 to 14 percent by weight of said $ZrO_2$, based on the total metal oxide content of said abrasive grain.

63. The method according to claim 59 wherein sintered alpha alumina-based abrasive grain comprises in the range from 1 to 3 percent by weight of said $SiO_2$ and in the range from 4 to 14 percent by weight of said $ZrO_2$, based on the total metal oxide content of said abrasive grain.

64. The method according to claim 59 wherein said contact pressure of at least 3.5 $kg/cm^2$.

65. The method according to claim 59 wherein said substrate is 1018 mild steel.

66. The method according to claim 59 wherein said contact pressure of at least 5 $kg/cm^2$.

67. The method according to claim 59 wherein said contact pressure of at least 7 $kg/cm^2$.

68. The method according to claim 59 wherein said contact pressure of at least 10 $kg/cm^2$.

69. The method according to claim 59 wherein said contact pressure of at least 20 $kg/cm^2$.

70. The method according to claim 59 wherein said substrate is selected from the group consisting of carbon steel stainless steel, titanium, paint, wood, and plastic.

71. The method according to claim 59 wherein said substrate is 4140 steel.

72. The method according to claim 59 wherein said substrate is 4150 steel.

* * * * *

UNITED STATES PATENT AND TRADEMARK OFFICE
CERTIFICATE OF CORRECTION

PATENT NO.     : 6,277,161 B1                                              Page 1 of 1
DATED          : August 21, 2001
INVENTOR(S)    : Castro, Darren T.

It is certified that error appears in the above-identified patent and that said Letters Patent is hereby corrected as shown below:

Column 6,
Line 25, delete "Is" after "e.g."

Column 17,
Line 27, "HN$_3$" should read -- HNO$_3$ --.

Column 25,
Line 51, insert -- The -- after "kilograms".

Column 26,
Line 54, "ebodiments" should read -- embodiments --.

Column 28,
Line 17, "ontent" should read -- content --.

Signed and Sealed this

Twenty-fifth Day of March, 2003

JAMES E. ROGAN
*Director of the United States Patent and Trademark Office*